(12) United States Patent
Utsumi

(10) Patent No.: US 10,306,100 B2
(45) Date of Patent: May 28, 2019

(54) IMAGE FORMING APPARATUS, METHOD OF CONTROLLING THE SAME, AND STORAGE MEDIUM

(71) Applicant: CANON KABUSHIKI KAISHA, Tokyo (JP)

(72) Inventor: Yuichi Utsumi, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/873,212

(22) Filed: Jan. 17, 2018

(65) Prior Publication Data

US 2018/0213114 A1    Jul. 26, 2018

(30) Foreign Application Priority Data

Jan. 23, 2017   (JP) ................................ 2017-009777

(51) Int. Cl.

| | |
|---|---|
| *G06F 3/12* | (2006.01) |
| *H04N 1/327* | (2006.01) |
| *H04N 1/21* | (2006.01) |
| *H04N 1/32* | (2006.01) |
| *H04N 1/04* | (2006.01) |
| *H04W 4/80* | (2018.01) |
| *H04N 1/00* | (2006.01) |

(52) U.S. Cl.
CPC ..... *H04N 1/32776* (2013.01); *H04N 1/00307* (2013.01); *H04N 1/04* (2013.01); *H04N 1/2104* (2013.01); *H04N 1/32122* (2013.01); *H04W 4/80* (2018.02); *H04N 2201/006* (2013.01); *H04N 2201/0094* (2013.01); *H04N 2201/3221* (2013.01)

(58) Field of Classification Search
CPC .. H04N 1/32776; H04N 1/00307; H04N 1/04; H04N 1/2104; H04N 1/32122; H04N 2201/006; H04N 2201/0094; H04N 2201/3221; H04W 4/80
USPC ........................................................ 358/1.15
See application file for complete search history.

(56) References Cited

U.S. PATENT DOCUMENTS

| | | | | |
|---|---|---|---|---|
| 9,148,543 | B2* | 9/2015 | Sugino | G06F 3/1204 |
| 9,665,317 | B2* | 5/2017 | Yokoyama | G06F 3/121 |
| 2014/0085654 | A1* | 3/2014 | Miyazaki | H04N 1/00209 358/1.13 |
| 2014/0118769 | A1* | 5/2014 | Adachi | G06F 3/1211 358/1.13 |

(Continued)

FOREIGN PATENT DOCUMENTS

JP    2013035287 A    2/2013

*Primary Examiner* — Neil R McLean
(74) *Attorney, Agent, or Firm* — Rossi, Kimms & McDowell LLP

(57) ABSTRACT

An image forming apparatus having a short-range wireless communication function includes a scanner that scans a document and generates image data of the document, and a storage that stores the image data generated by the scanner. If an operation mode of scanning a document by the scanner and transmitting image data of the document to an external apparatus by the short-range wireless communication function is instructed, the scanner is controlled to generate image data of a document, and store the image data in the storage, and then the image data stored in the storage is transmitted to the external apparatus by the short-range wireless communication function.

9 Claims, 23 Drawing Sheets

(56) References Cited

U.S. PATENT DOCUMENTS

| | | | |
|---|---|---|---|
| 2014/0168694 A1* | 6/2014 | Hiruma | H04N 1/00206 |
| | | | 358/1.15 |
| 2014/0376044 A1* | 12/2014 | Utsumi | H04N 1/00106 |
| | | | 358/1.15 |
| 2015/0036185 A1* | 2/2015 | Asai | H04N 1/00973 |
| | | | 358/1.15 |

* cited by examiner

FIG. 8A

SCAN

PLEASE SELECT SCAN TYPE

| PC | FILE SERVER |
| USB MEMORY | TransferJet |
| E-mail | |

TransferJet SCAN

PLEASE MAKE SCAN SETTINGS

| 803 | DOCUMENT SIZE | ▶A4 | RESET// | 807 |
| 804 | SCAN RESOLUTION | ▶300dpi | MONOCHROME <<START>> | 808 |
| 805 | DOUBLE-SIDED SETTING | ▶SINGLE-SIDED SCAN | COLOR <<START>> | 809 |
| 806 | SAVED FILE FORMAT | ▶PDF FILE | | |

SCANNING — 810

SCAN IS IN PROGRESS

STOP — 811

SCANNING

IF THERE IS NEXT PAGE OF DOCUMENT, PLEASE PLACE PAGE OF DOCUMENT ON GLASS DOCUMENT TABLE, AND PRESS "NEXT PAGE SCAN"
IF SCAN IS COMPLETE, PLEASE PRESS "SCAN COMPLETION"

| NEXT PAGE SCAN | SCAN COMPLETION | STOP |

813, 814, 811, 812, 207

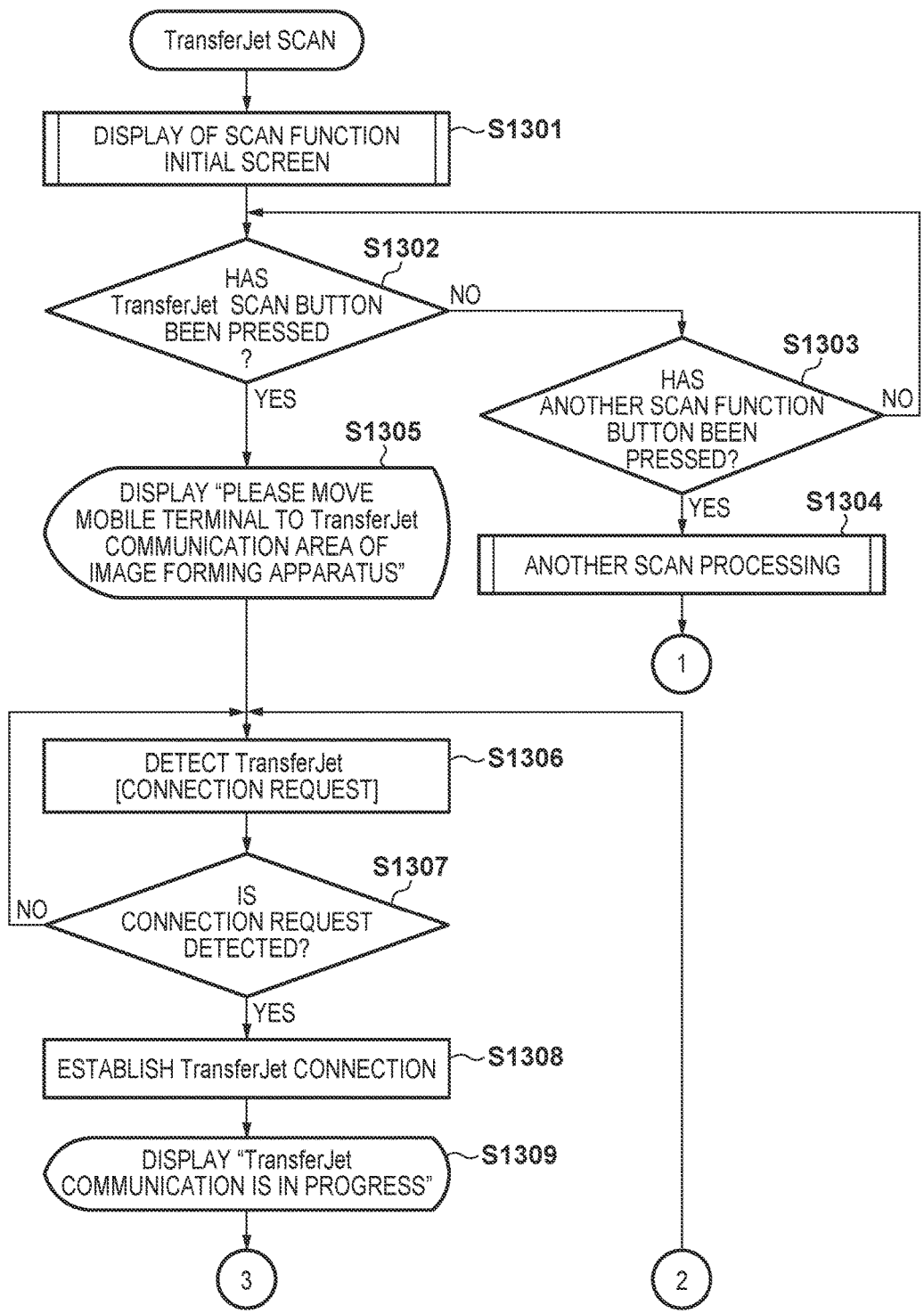

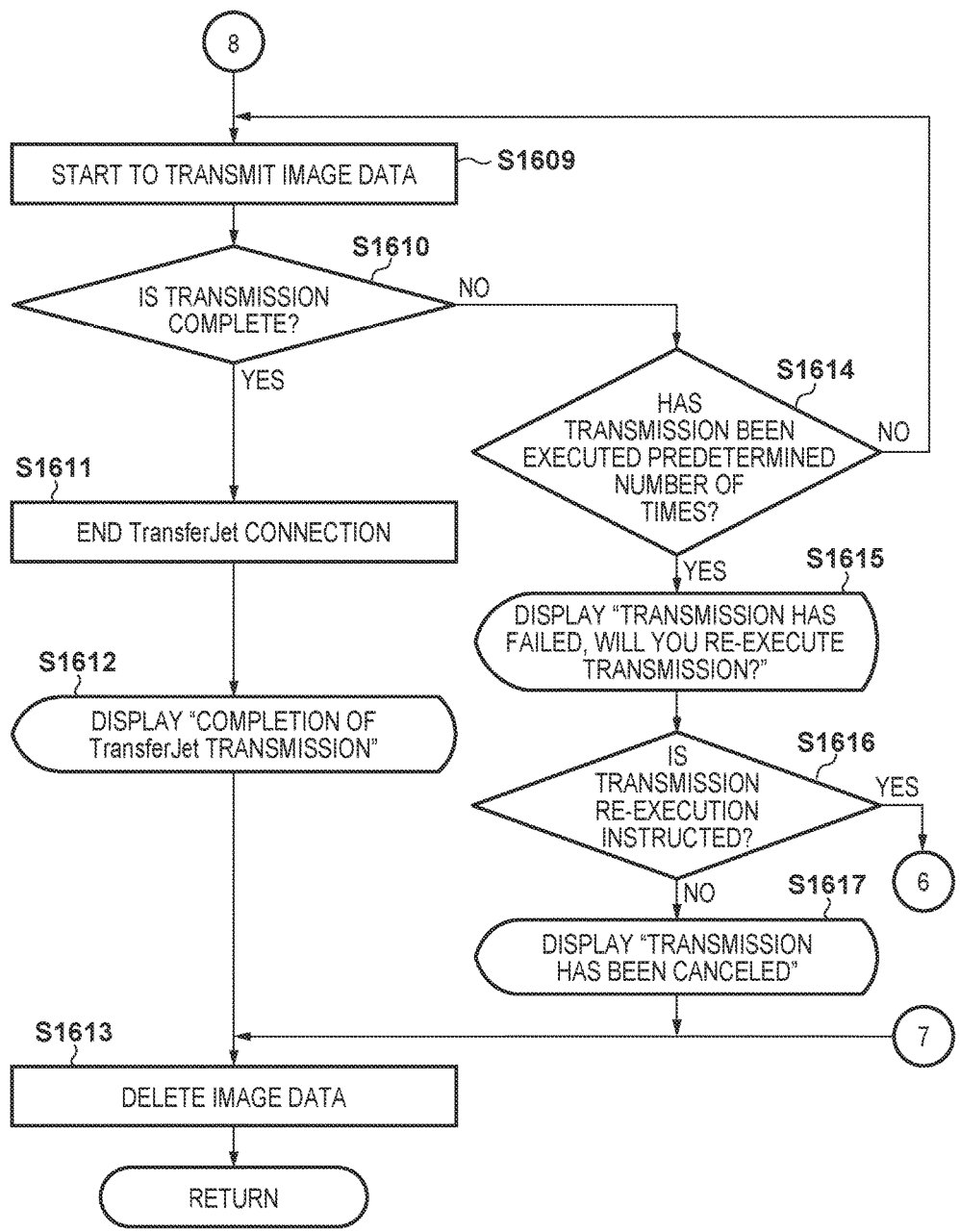

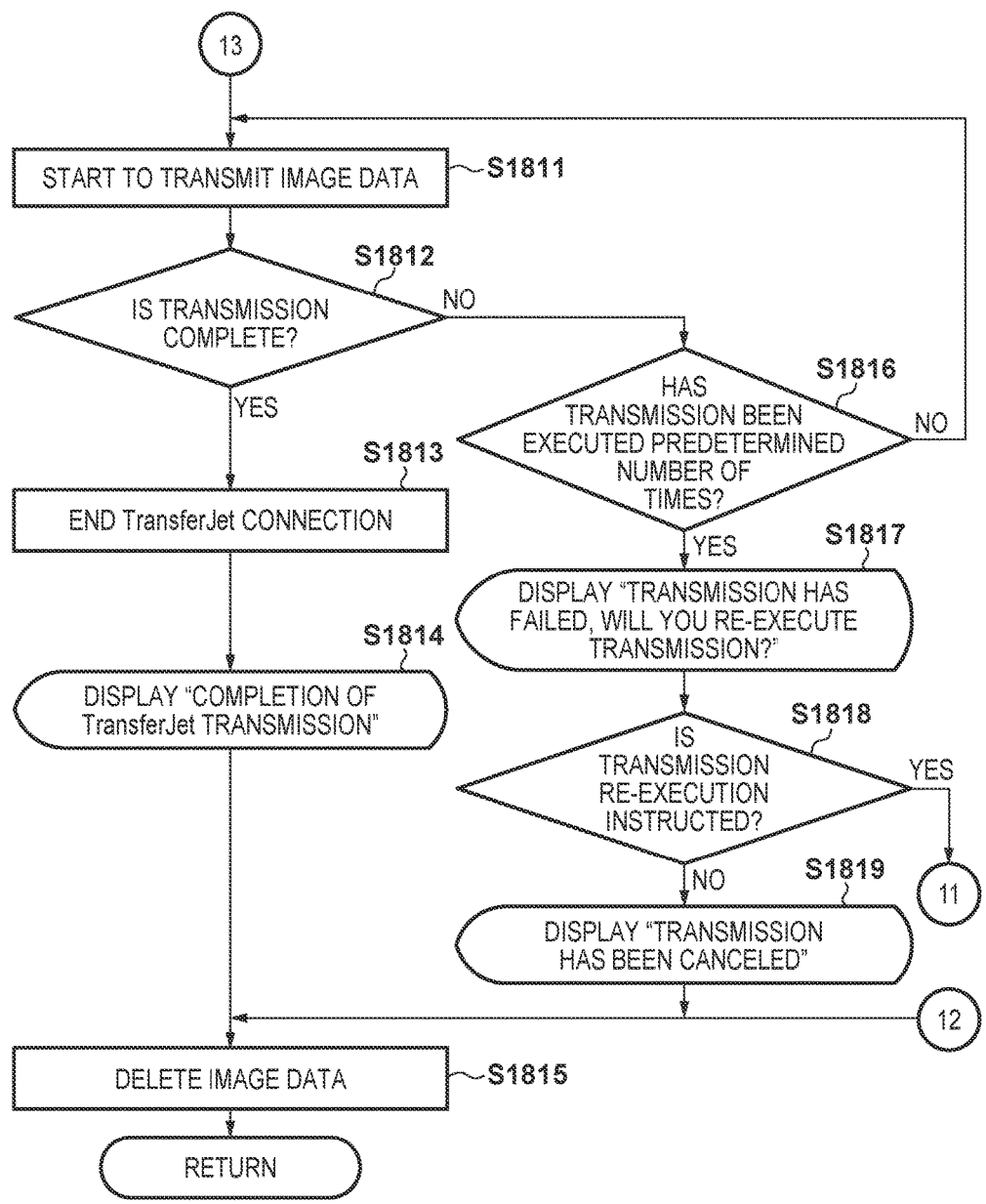

IMAGE FORMING APPARATUS, METHOD OF CONTROLLING THE SAME, AND STORAGE MEDIUM

BACKGROUND OF THE INVENTION

Field of the Invention

The present invention relates to an image forming apparatus, a method of controlling the same, and a storage medium.

Description of the Related Art

In recent years, mobile terminals such as a smartphone and tablet PC having a short-range wireless communication function such as TransferJet® or NFC have become widespread. Even a mobile terminal having no short-range wireless communication function can readily perform short-range wireless communication by connecting an external device such as a dongle having a short-range wireless communication function to the mobile terminal via a USB connector or the like. In short-range wireless communication using, for example, TransferJet, it is possible to communicate a large amount of data without creating in advance an environment for wireless LAN communication.

An image forming apparatus such as an MFP (Multi Function Peripheral) or printer having such short-range wireless communication function uses this communication function to transfer a large amount of image data. For example, Japanese Patent Laid-Open No. 2013-35287 discloses an image forming apparatus that receives, by one communication operation, file data to be printed from an information device having a short-range wireless communication function, such as a mobile terminal or notebook PC, and prints an image based on the received file data.

However, an instruction of an operation of causing, using data communication by short-range wireless communication, the image forming apparatus to execute a scan operation of a document by operating the mobile terminal and causing the image forming apparatus to transmit, to the mobile terminal, image data of the document obtained by the scan operation becomes complicated. For example, if the image forming apparatus scans a document of a plurality of pages, and transmits image data of the document to the mobile terminal by short-range wireless communication, it is necessary to always locate the mobile terminal in an area where short-range wireless communication by the image forming apparatus is possible while the document is scanned. Therefore, a method in which the user of the mobile terminal can readily instruct the above-described operation, and determine the timing of moving the mobile terminal to the area where short-range wireless communication by the image forming apparatus is possible has been desired.

SUMMARY OF THE INVENTION

An aspect of the present invention is to eliminate the above-mentioned problem with conventional technology.

A feature of the present invention is to provide a technique of allowing a user to readily instruct the above-described operation.

According to a first aspect of the present invention, there is provided an image forming apparatus having a short-range wireless communication function, comprising: a scanner that scans a document and generates image data of the document; a storage that stores the image data generated by the scanner; a memory device that stores a set of instructions; and at least one processor that executes the instructions to function as: a control unit that, if an operation mode of scanning a document by the scanner and transmitting image data of the document to an external apparatus by the short-range wireless communication function is instructed, controls to generate image data of a document by controlling the scanner, store the image data in the storage, and then transmit the image data stored in the storage to the external apparatus by the short-range wireless communication function.

According to a second aspect of the present invention, there is provided a method of controlling an image forming apparatus having a short-range wireless communication function, the method comprising: scanning a document and generating image data of the document; storing the generated image data in a memory; and controlling to, if an operation mode of scanning a document in the scanning and transmitting image data of the document to an external apparatus by the short-range wireless communication function is instructed, generate image data of a document in the scanning, store the image data in the memory, and then transmit the image data stored in the memory to the external apparatus by the short-range wireless communication function.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 8A to 8D depict views respectively showing examples of a screen displayed on a display unit when the image forming apparatus executes the processing represented by the flowchart of FIG. 7 according to the first embodiment;

FIGS. 13A and 13B are flowcharts for describing processing in which the mobile terminal receives the image data transmitted from the image forming apparatus according to the first embodiment;

FIGS. 16A and 16B are flowcharts for describing processing in which an image forming apparatus transmits scanned image data to a mobile terminal via TransferJet in step S711 of FIG. 7 according to the third embodiment;

FIGS. 18A and 18B are flowcharts for describing processing in which the image forming apparatus transmits scanned image data to a mobile terminal via TransferJet in step S1719 of FIG. 17B according to the fourth embodiment.

DESCRIPTION OF THE EMBODIMENTS

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

[First Embodiment]

Figure 1:
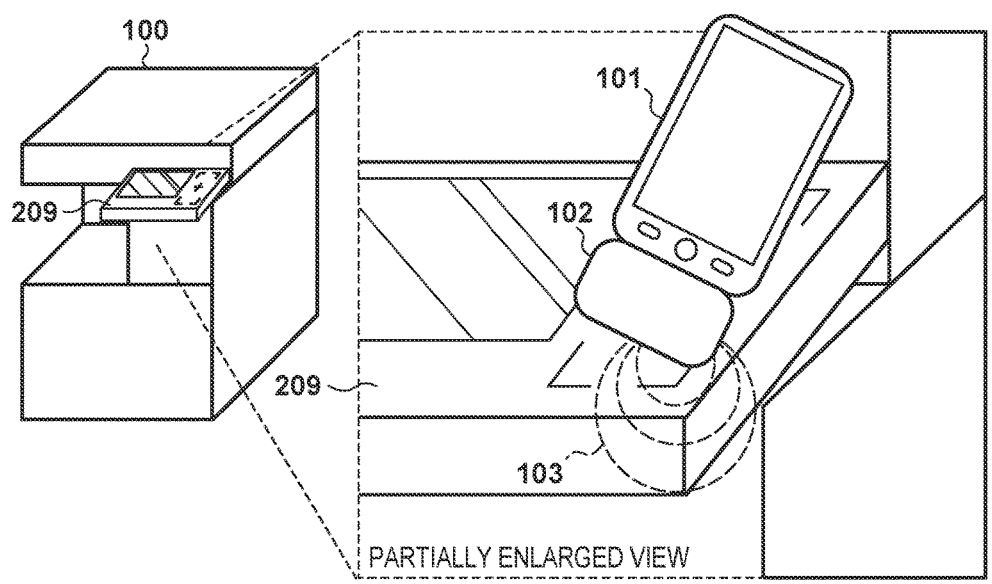
FIG. 1 depicts a view for explaining the positional relationship among an image forming apparatus, a mobile terminal, and a short-range wireless communication device according to the first embodiment of the present invention.

FIG. 1 depicts a view for explaining the positional relationship among an image forming apparatus 100, a mobile terminal 101, and a short-range wireless communication device 102 according to the first embodiment of the present invention.

The image forming apparatus 100 is a printer or an MFP (Multi Function Peripheral) having a plurality of functions such as copy and FAX functions, and has a TransferJet short-range wireless communication function. The mobile terminal 101 is, for example, a smartphone, a tablet type personal computer, or the like. The short-range wireless communication device 102 has a TransferJet short-range wireless communication function and an external wired connection function such as USB. TransferJet is one of short-range wireless communication standards, and starts communication by bringing the TransferJet antennas of a pair of communication devices into contact with each other to automatically establish connection between the devices. Since a communication speed at this time is up to 560 Mpbs, it is possible to communicate various data such as document data, image data, and video data. Therefore, using TransferJet, the user can perform data communication at a higher speed than that of the NFC (Near Field Communication) standard by the same touch operation as that of the NFC standard. In addition, since a communication distance is as short as several cm in TransferJet, the interference with another wireless system is small, and a risk that contents of wireless communication leak is low.

While the mobile terminal 101 and the short-range wireless communication device 102 are connected by connection I/Fs, the short-range wireless communication device 102 and the image forming apparatus 100 perform short-range communication by TransferJet. This transmits data from the mobile terminal 101 to the image forming apparatus 100 or transmits data from the image forming apparatus 100 to the mobile terminal 101.

A communicable area 103 is an area where antennas that transmit radio waves of TransferJet can communicate with each other, and is generally about several cm. Therefore, when performing short-range wireless communication using TransferJet, it is necessary to bring antennas, that communicate with each other, close to within the communicable area 103. When the antennas that communicate with each other using TransferJet fall outside the communicable area 103, even if the antennas transmit radio waves using TransferJet, no communication is performed, and thus communication by TransferJet fails.

In the first embodiment, in a state in which the image forming apparatus 100 or the short-range wireless communication device 102 transmits a TransferJet connection request, the image forming apparatus 100 and the short-range wireless communication device 102 enter the communicable area 103. At this time, TransferJet communication is established between the image forming apparatus 100 and the short-range wireless communication device 102. Then, the apparatus that has transmitted the connection request transmits data, and the apparatus that has received the connection request receives the data.

In the first embodiment, the image forming apparatus 100 scans a document by operating the mobile terminal 101, and transmits, to the mobile terminal 101, image data obtained by the scan operation. An outline of this operation is as follows.

First, the image forming apparatus 100 is operated to transit to a scan mode. A scan job of transmitting image data obtained by a scan to the mobile terminal 101 by TransferJet communication is activated in the scan mode. The user sets settings (scan document size, scan resolution, color mode, and the like) of the scan job via a console unit 209 of the image forming apparatus 100. Upon completion of setting of the scan job, the user sets a document, and executes a scan by operating the console unit 209 of the image forming apparatus 100. Upon completion of the scan of all the pages of the document, the image forming apparatus 100 displays, on the console unit 209, a message to move the short-range wireless communication device 102 of the mobile terminal 101 close to within the communicable area 103 of the image forming apparatus 100. The user activates an application operating on the mobile terminal 101, and moves the short-range wireless communication device 102 connected to the mobile terminal 101 to the communicable area 103 of the image forming apparatus 100. A partially enlarged view shown in FIG. 1 shows a state in which the short-range wireless communication device 102 connected to the mobile terminal 101 is moved closer to the communicable area 103. If the short-range wireless communication device 102 enters the communicable area 103, TransferJet communication is established and the image forming apparatus 100 transmits scanned image data to the mobile terminal 101. Upon completion of transmission of all scanned image data, a message indicating completion of the scan job is displayed on each of the display units of the image forming apparatus 100 and mobile terminal 101, thereby completing the scan job.

Figure 2:
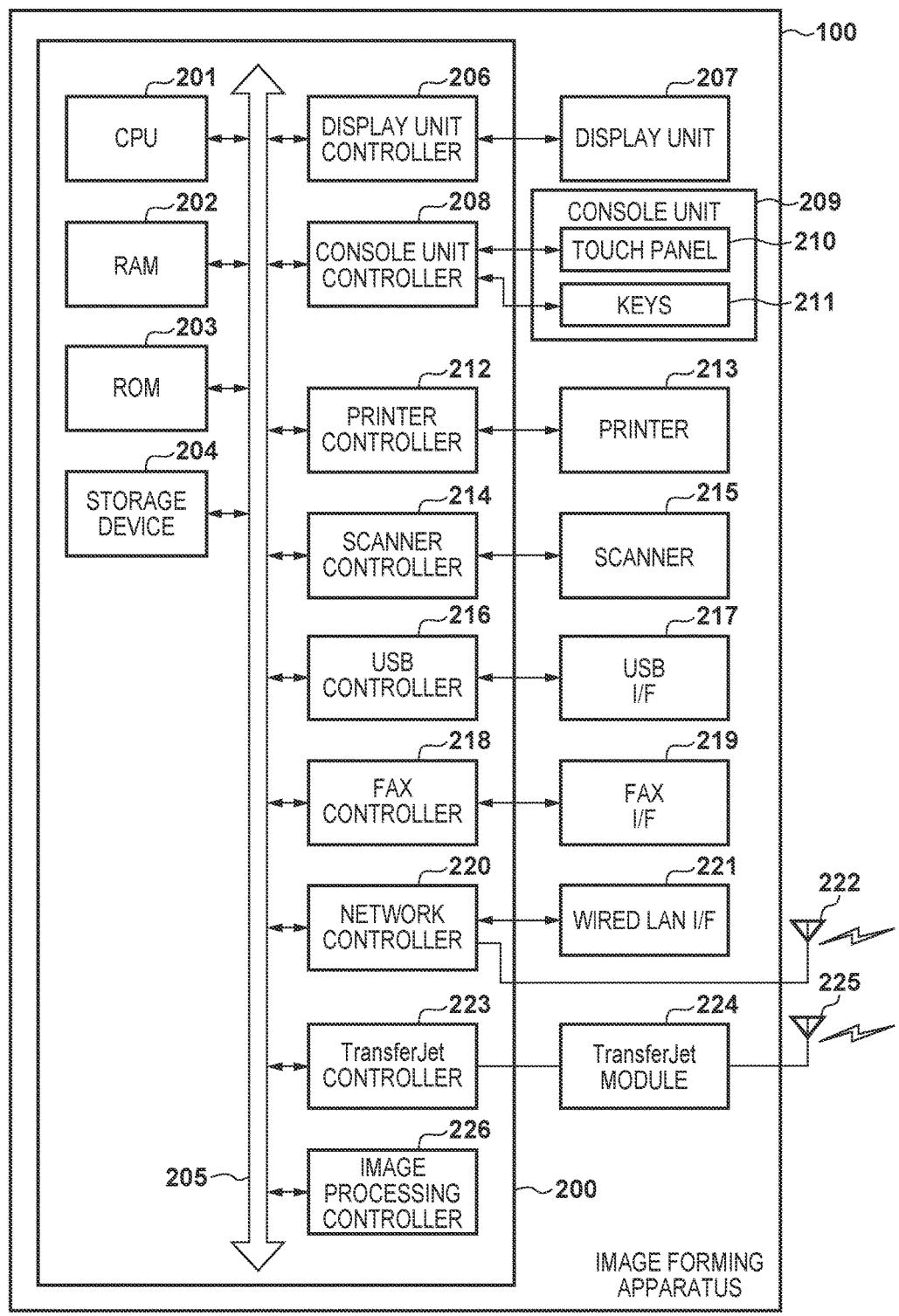
FIG. 2 is a block diagram for explaining the hardware arrangement of the image forming apparatus according to the first embodiment.

FIG. 2 is a block diagram for explaining the hardware arrangement of the image forming apparatus 100 according to the first embodiment.

The image forming apparatus 100 includes a controller (control unit) 200, a display unit 207, the console unit 209, a printer 213, and a scanner 215. The image forming apparatus 100 also includes a USB I/F 217, a FAX I/F 219, a wired LAN I/F 221, a wireless LAN antenna 222, a TransferJet module 224, and a TransferJet antenna 225.

The controller 200 includes a CPU 201, a RAM 202, a ROM 203, a storage device 204, a system bus 205, a display unit controller 206, a console unit controller 208, a printer controller 212, and a scanner controller 214. The controller 200 also includes a USB controller 216, a FAX controller 218, a network controller 220, a TransferJet controller 223, and an image processing controller 226. The console unit 209 includes a touch panel 210 and keys 211.

The CPU 201 is a central processing unit that controls the overall image forming apparatus 100, and is connected to respective units by the system bus 205. The RAM 202 serves as a work memory to operate the CPU 201, and is used to deploy various programs, save an arithmetic processing result, or save image data processed by the image processing controller 226 by a print operation, a scan operation, or the like. The ROM 203 is a memory storing a boot program of the CPU 201, various kinds of setting information, and the like. The storage device 204 is a nonvolatile memory for saving a program of a large size, and data, and is a flash memory in the controller 200 or an external memory device such as an HDD connected from the external I/F. The display unit controller 206 transmits image data to the display unit 207 in accordance with the communication protocol of the display unit 207. The console unit controller 208 accepts inputs from the touch panel 210 and the keys 211, and converts them into data understandable by the CPU 201. Note that the display unit 207 and the touch panel 210 may be integrally formed.

The printer controller 212 controls various devices such as a photosensitive drum, laser oscillator, and toner fixing unit related to the print operation of the printer 213 to print image data designated by the CPU 201. The scanner controller 214 controls various devices such as a document detection sensor and scan sensor related to the scan operation of the scanner 215. The USB controller 216 communicates image data and the like with an external terminal connected via the USB I/F 217. The FAX controller 218 communicates image data and the like with a telephone line or the like connected via the FAX I/F 219 and a public switched telephone network. The network controller 220 performs network communication with an external device connected via the wired LAN I/F 221 and a LAN cable. The network controller 220 wirelessly transmits/receives data to/from an external terminal via the wireless LAN antenna 222. The image processing controller 226 performs image processing of the image data scanned by the scanner 215, processing of converting the data into image data to be printed by the printer 213, such as enlargement, reduction, or monochromatic processing, and the like.

The TransferJet controller 223 controls the TransferJet module 224 to transmit a connection request to an external terminal via the TransferJet antenna 225, and transmit/receive data to/from the external terminal. Upon receiving a connection request from an external terminal, the TransferJet controller 223 and/or the TransferJet module 224 establishes TransferJet connection. Note that the TransferJet antenna 225 is desirably arranged at a position where it is possible to communicate with the external terminal at a short range of about several cm. In the first embodiment, the TransferJet antenna 225 is incorporated in the console unit 209.

Figure 3:
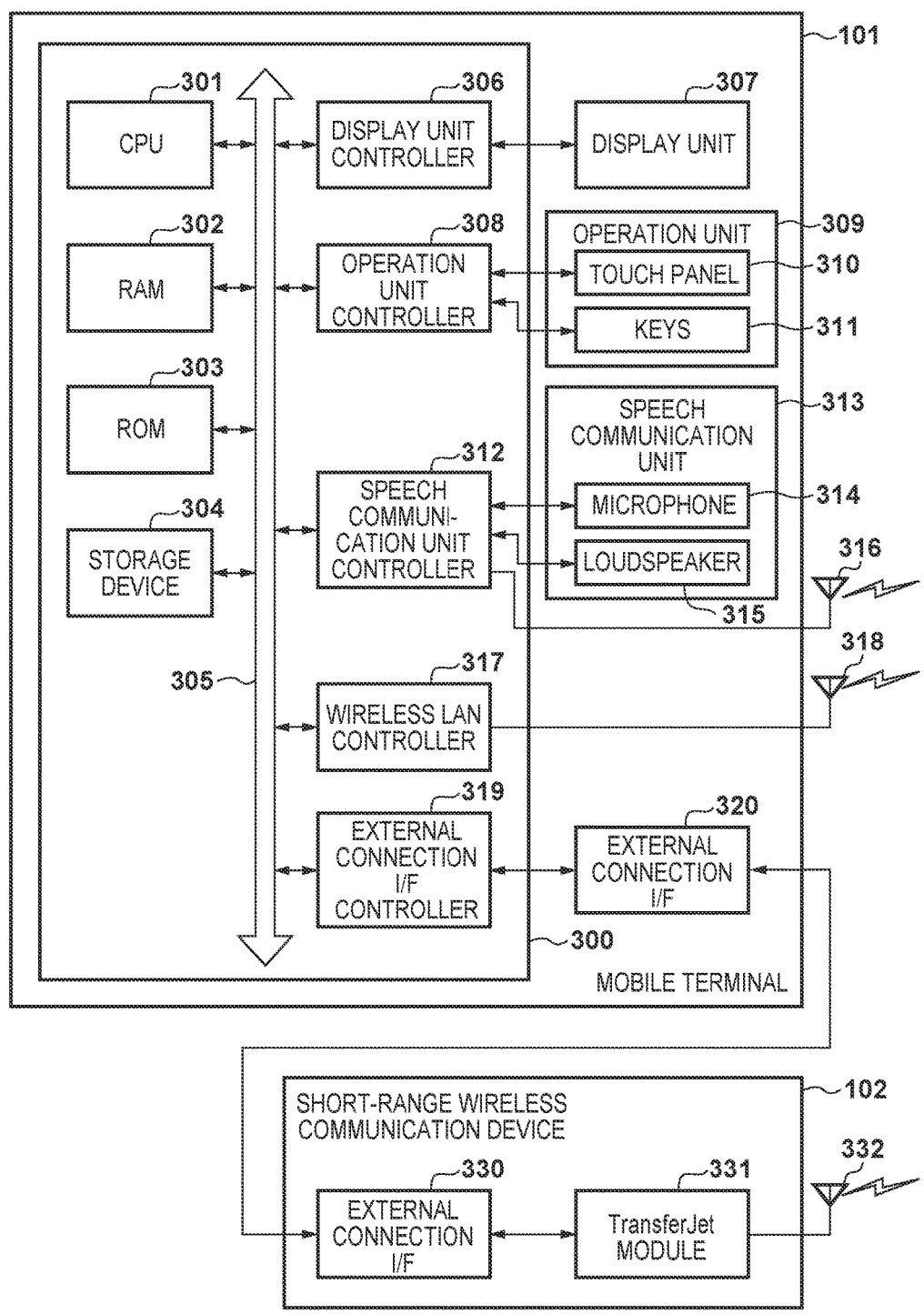
FIG. 3 is a block diagram for explaining the hardware arrangements of the mobile terminal and short-range wireless communication device according to the first embodiment.

FIG. 3 is a block diagram for explaining the hardware arrangements of the mobile terminal 101 and short-range wireless communication device 102 according to the first embodiment.

The mobile terminal 101 includes a controller (control unit) 300, a display unit 307, an operation unit 309, a speech communication unit 313, an audio antenna 316, a wireless LAN antenna 318, and an external connection I/F 320. The controller 300 includes a CPU 301, a RAM 302, a ROM 303, and a storage device 304. The controller 300 also includes a display unit controller 306, an operation unit controller 308, a speech communication unit controller 312, a wireless LAN controller 317, and an external connection I/F controller 319, all of which are connected to a system bus 305. The operation unit 309 includes a touch panel 310 and keys 311. The speech communication unit 313 includes a microphone 314 and a loudspeaker 315. Note that the display unit 307 and the touch panel 310 may be integrally formed.

The short-range wireless communication device 102 includes an external connection I/F 330, a TransferJet module 331, and a TransferJet antenna 332.

The CPU 301 is a central processing unit that controls the mobile terminal 101, and is connected to respective units via the system bus 305. The RAM 302 provides a work memory to operate the CPU 301, and is used to deploy various programs or save an arithmetic processing result. The ROM 303 saves a boot program of the CPU 301 and various kinds of setting information. The storage device 304 is a nonvolatile memory for saving a program of a large size, and data, and is a flash memory in the controller 300 or an external memory device such as an SD card connected from the external I/F. The display unit controller 306 transmits image data to the display unit 307 in accordance with the communication protocol of the display unit 307. The operation unit controller 308 accepts inputs from the touch panel 310 and keys 311, and converts them into data understandable by the CPU 301. The speech communication unit controller 312 converts an audio signal received from the microphone 314 into a radio wave to be transmitted to a partner terminal (an external apparatus) and outputs the radio wave to the audio antenna 316, or converts a radio wave received by the audio antenna 316 from a partner terminal (not shown) into an audio and outputs the audio to the loudspeaker 315. The wireless LAN controller 317 transmits/receives data to/from an external terminal via the wireless LAN antenna 318.

The external connection I/F controller 319 communicates with an external terminal connected by a cable via the external connection I/F 320. In the first embodiment, the external connection I/F 320 and the external connection I/F 330 of the short-range wireless communication device 102 are connected to each other. The external connection I/F 320 of the mobile terminal 101 and the external connection I/F 330 of the short-range wireless communication device 102 need to operate in accordance with the same standard. For example, a USB I/F or Lightning I/F may be used. The TransferJet module 331 is controlled via the external connection I/F controller 319 of the mobile terminal 101 by the application operating on the mobile terminal 101 to transmit a connection result to an external terminal and transmit/receive data to/from the external terminal. The TransferJet module 331 and/or the application operating on the mobile terminal 101 has a function of establishing, upon receiving a connection request from an external terminal, TransferJet connection.

In the first embodiment, the mobile terminal 101 and the short-range wireless communication device 102 are separated from each other. However, TransferJet communication may be performed using the mobile terminal 101 incorporating the function of the short-range wireless communication device 102.

Figure 4:
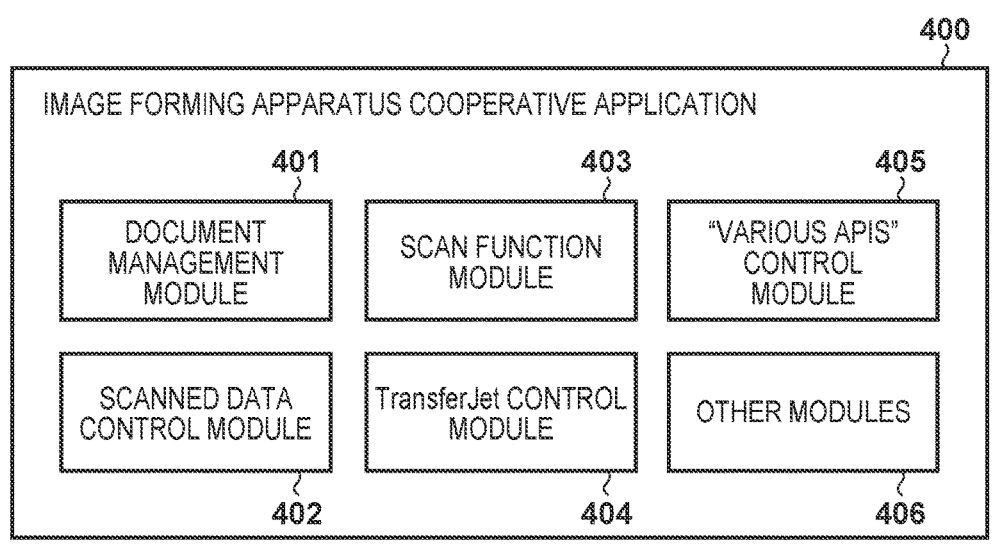
FIG. 4 depicts a view for explaining an application (cooperative application) executed in the mobile terminal according to the first embodiment.

FIG. 4 depicts a view for explaining the application executed in the mobile terminal 101 according to the first embodiment. The application executed here will be referred to as an image forming apparatus cooperative application 400 (cooperative application 400) hereinafter.

The function of the cooperative application 400 is implemented by deploying a program stored in the ROM 303 or storage device 304 of the controller 300 of the mobile terminal 101 in the RAM 302, and executing the program by the CPU 301. Note that data and parameters used at this time are saved in the RAM 302, the ROM 303, or the storage device 304, and processed.

A document management module 401 provides a function of displaying a list of files of a folder in which image data (for example, jpeg, pdf, or the like) stored in a storage such as the RAM 302 or storage device 304 of the controller 300 of the mobile terminal 101 exist, and operating the files. A scanned data control module 402 saves the image data transmitted from the image forming apparatus 100 in a storage destination folder selected by the user using the document management module 401. A scan module 403 executes processing related to the scan function of the cooperative application 400. Examples of the scan function are a TransferJet scan of receiving, via TransferJet communication, image data acquired by scanning by the image forming apparatus 100, and a Wi-Fi scan of executing a scan job via Wi-Fi. In the Wi-Fi scan, for example, if the scan function is executed from the cooperative application 400, a scan job based on scan settings set by the scan module 403 is generated, and executed from the mobile terminal 101 via Wi-Fi. The scan module 403 also sets/manages setting information (for example, image forming apparatus information, address information, cloud storage authentication information, and scan job setting information) to be used by the cooperative application 400. A TransferJet control module 404 controls the short-range wireless communication device 102 from the cooperative application 400 via the external connection I/F 320. A "various APIs" control module 405 can control file sharing by calling, from the cooperative application 400, another program operating on the mobile terminal 101, and control various devices of the mobile terminal 101 using device control APIs. Other modules 406 are various modules operable on the cooperative application 400, and include basic functions such as UI display, and a detailed description thereof will be omitted. When executing a print function in cooperation with the image forming apparatus 100, the other modules 406 execute processing. Although the function of the mobile terminal 101 according to the first embodiment is implemented using the above-described functional blocks, the structure of the functional blocks of the cooperative application 400 is not limited to this.

FIGS. 5A to 5H depict views for explaining examples of a screen displayed on the display unit 307 of the mobile terminal 101 by executing the cooperative application 400 according to the first embodiment. As described above, the cooperative application 400 is an application executed by the mobile terminal 101, and is an application used by the image forming apparatus 100 and the mobile terminal 101 to operate in cooperation with each other. The cooperative application 400 according to the first embodiment includes a scan function for causing the image forming apparatus 100 to execute a scan, a print function for causing the image forming apparatus 100 to execute printing, and various setting functions for setting various settings of the image forming apparatus 100 from the cooperative application 400. The scan function will be described.

Figure 5A:
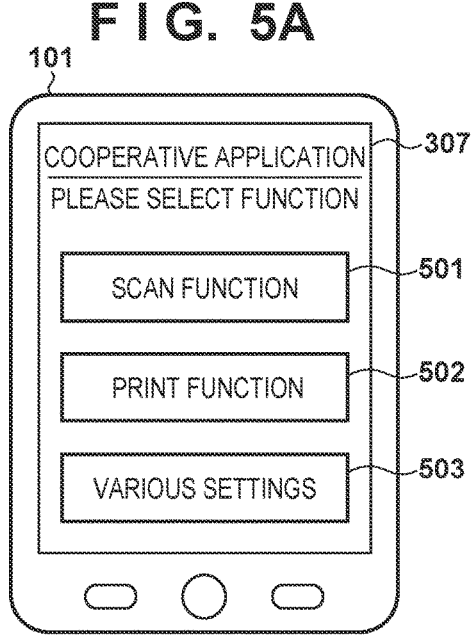
FIGS. 5A to 5H depict views for explaining examples of a screen displayed on a display unit of the mobile terminal by executing the cooperative application according to the first embodiment.

FIG. 5A shows an initial screen when the cooperative application 400 is activated. Upon activation of the cooperative application 400, a screen for selecting a function to be implemented is displayed on the display unit 307 of the mobile terminal 101. If the user wants to execute the scan function, he/she presses a scan function button 501. If the user wants to execute the print function, he/she presses a print function button 502. If the user wants to make various settings of the image forming apparatus 100 from the cooperative application 400, he/she presses a "various settings" button 503. In the first embodiment, a case in which the user presses the scan function button 501 will be described.

Figure 5B:
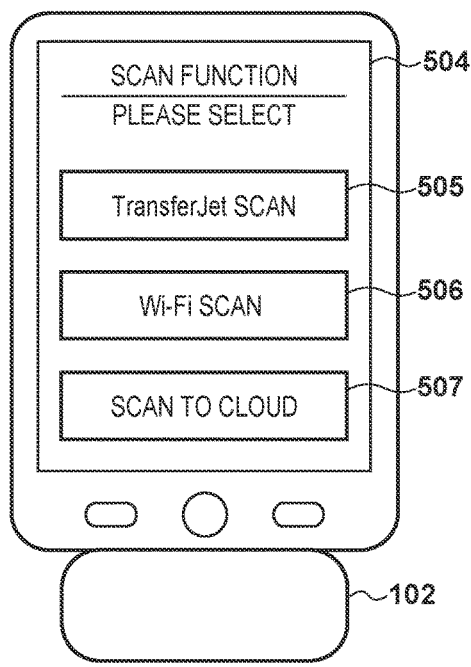

Upon the pressing of the scan function button 501, a scan function screen 504 shown in FIG. 5B is displayed on the display unit 307. In the scan function screen 504, a button 505 of the TransferJet scan (the operation mode of executing a scan and transmitting image data to the mobile terminal 101 via TransferJet) and a Wi-Fi scan button 506 are selectively displayed. Furthermore, a button 507 for implementing Scan to Cloud of transmitting scanned image data to a storage server on the Internet via the mobile terminal 101 may be selectable. To determine whether the TransferJet scan is executable, the user determines whether the TransferJet module (short-range wireless communication device 102) is connected to the mobile terminal 101. FIG. 5B shows an example of a screen displayed when the short-range wireless communication device 102 is connected to the mobile terminal 101. The short-range wireless communication device 102 is connected to the mobile terminal 101 by an external wired interface such as USB.

Figure 5C:
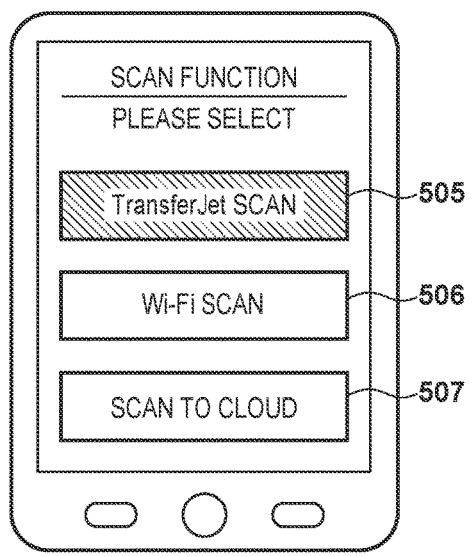

FIG. 5C shows an example of the scan function screen displayed when no short-range wireless communication device 102 is connected to the mobile terminal 101 (and no short-range wireless communication device 102 is incorporated in the mobile terminal 101). Since no short-range wireless communication device 102 for performing TransferJet communication is connected, the TransferJet scan button 505 is disabled (grayed out).

The display switching processing of the scan function screen in the mobile terminal 101 according to the first embodiment will be described with reference to a flowchart shown in FIG. 6.

Figure 6:
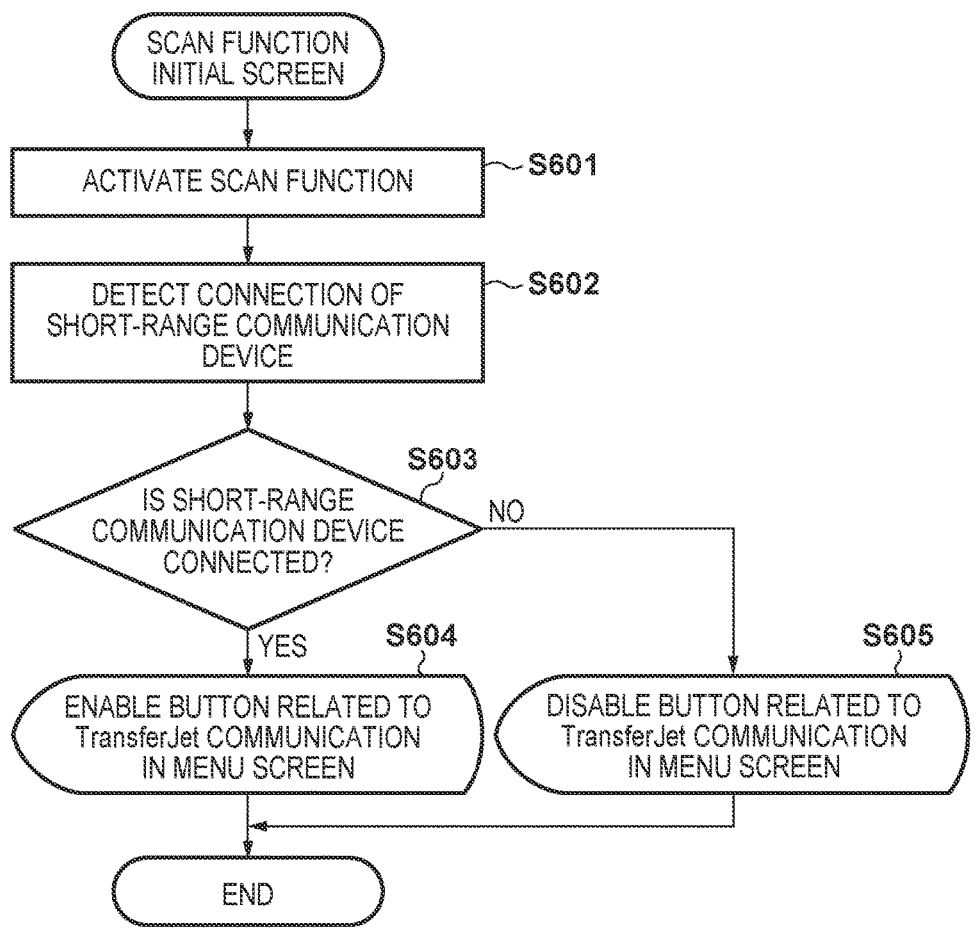
FIG. 6 is a flowchart for describing display switching processing of a scan function screen in the mobile terminal according to the first embodiment.

FIG. 6 is a flowchart for describing the display switching processing of the scan function screen in the mobile terminal 101 according to the first embodiment. Note that the processing represented by the flowchart is implemented when the CPU 301 executes a program deployed from the storage device 304 in the RAM 302.

This processing starts when the scan function button 501 displayed by the cooperative application 400 is pressed. In step S601, the CPU 301 activates the scan module 403. The process advances to step S602, and the CPU 301 detects whether the short-range wireless communication device 102 (TransferJet module) is connected to the mobile terminal 101. In step S603, the CPU 301 determines whether the short-range wireless communication device 102 is connected. If it is determined that the short-range wireless communication device 102 is connected, the process advances to step S604, and the CPU 301 enables the button 505 related to TransferJet communication in the scan function screen 504 to be displayed on the display unit 307, thereby ending this process. More specifically, as shown in FIG. 5B, the TransferJet scan button 505 is displayed to be able to select and execute the TransferJet scan.

On the other hand, if the CPU 301 determines in step S603 that no short-range wireless communication device 102 is connected, the process advances to step S605. In step S605, the CPU 301 disables the TransferJet scan button 505, as shown in, for example, FIG. 5C, not to be able to select the TransferJet scan. Then, this process ends.

The processing of the scan function using TransferJet communication executed by the image forming apparatus 100 according to the first embodiment will be described next.

Figure 7:
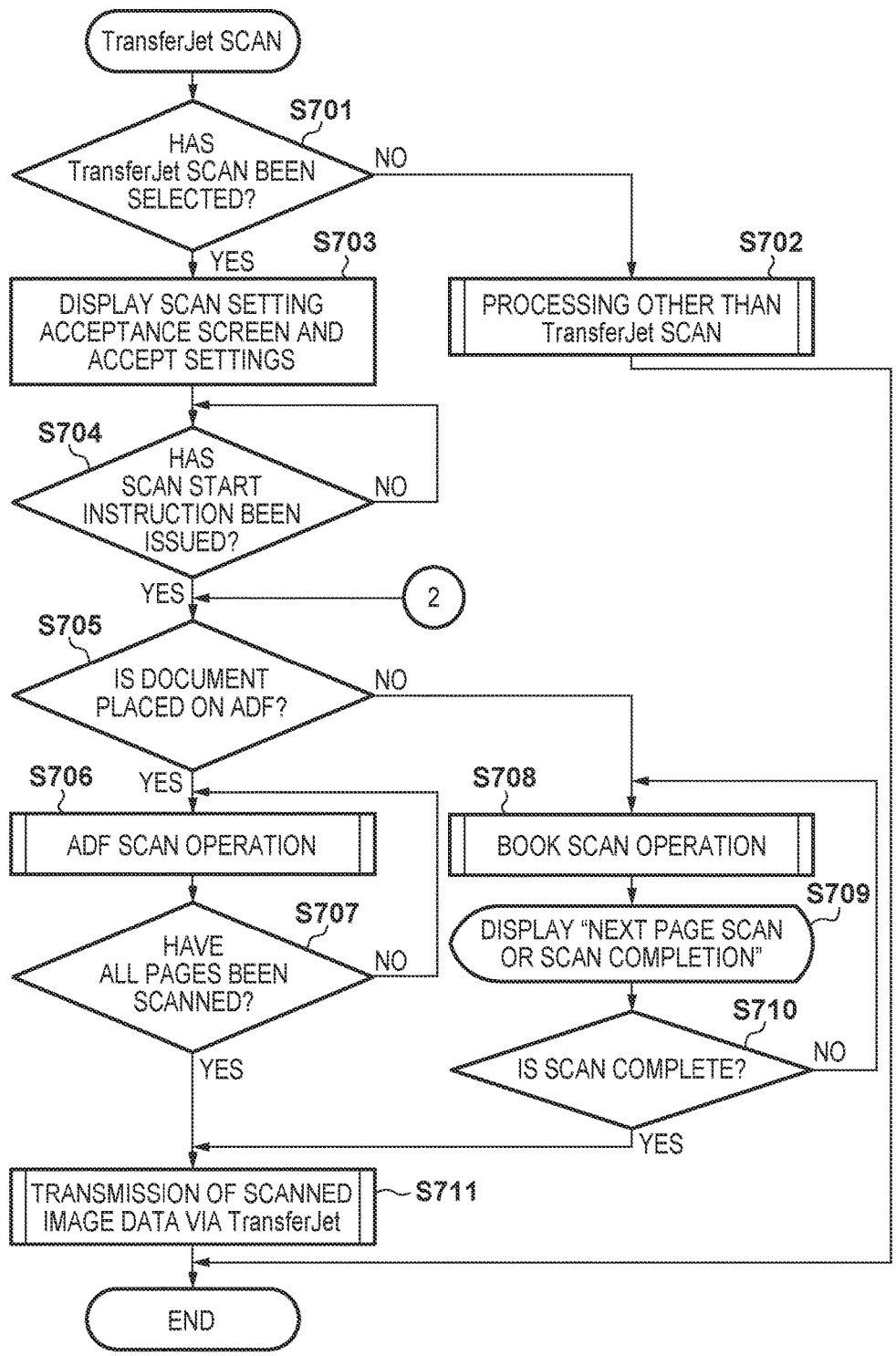
FIG. 7 is a flowchart for describing processing of a TransferJet scan executed by the image forming apparatus according to the first embodiment.

FIG. 7 is a flowchart for describing the processing of a TransferJet scan (a mode of executing a scan job to transmit image data to the mobile terminal 101 via TransferJet) executed by the image forming apparatus 100 according to the first embodiment. Note that the processing represented by this flowchart is implemented when the CPU 201 executes a program deployed from the storage device 204 in the RAM 202.

FIGS. 8A to 8D depict views respectively showing examples of a screen displayed on the display unit 207 when the image forming apparatus 100 executes the processing represented by the flowchart of FIG. 7 according to the first embodiment. Note that the flowchart shown in FIG. 7 illustrates processing from when the image forming apparatus 100 transits to the scan mode.

At the start of this processing, the image forming apparatus 100 that has transited to the scan mode displays options of the scan mode on the display unit 207. FIG. 8A depicts a view showing an example a scan mode screen 801 displayed on the display unit 207 at this time. The scan mode includes a plurality of operation modes in accordance with a method of processing image data obtained by scanning by the scanner 215. As an example, there is a PC scan operation of transmitting scanned image data to a PC (Personal Computer) via the USB I/F 217, and saving it as an image file in a predetermined folder. There is also a Scan to USB memory operation of transmitting scanned image data to a USB memory (flash memory) via a USB Host I/F. In the first embodiment, an operation (to be referred to as a TransferJet scan hereinafter) of transmitting the scanned image data to the mobile terminal 101 via TransferJet will be described. When executing the TransferJet scan, the user presses a TransferJet button 802 on the display unit 207. Note that a description of the above-mentioned scan operation modes other than the TransferJet scan operation will be omitted.

In step S701, the CPU 201 determines whether or not the TransferJet scan has been selected from the scan operation modes. If the TransferJet button 802 has been pressed, the process advances to step S703. If it is determined in step S701 that a button other than the TransferJet button 802 shown in FIG. 8A has been selected, the process advances to step S702 to execute processing instructed by the button. This processing is not considered as the feature of the present invention and a description thereof will be omitted. In step S703, the CPU 201 displays a scan setting screen on the display unit 207, and accepts a user operation via this screen. FIG. 8B depicts a view showing an example of the scan setting screen.

In the scan setting screen in FIG. 8B, a document size, a scan resolution, a single-sided document or double-sided document, a saved file format, and the like are selectable. To change the setting of the document size, the user presses a document size selection button 803 to make a selection. To change the setting of the scan resolution, the user presses a scan resolution selection button 804 to make a selection. To change the double-sided setting, the user presses a double-sided setting selection button 805 to make a selection. Furthermore, to change the setting of the saved file format, the user presses a saved file format selection button 806 to select a desired file format. To reset the settings to the initial state (default settings), the user presses a reset button 807. To start a scan operation in a black-and-white (monochrome) mode, the user presses a monochrome start button 808. To start a scan operation in a color mode, the user presses a color start button 809. These setting operations by the user are accepted by the console unit 209 and processed by the console unit controller 208 and the CPU 201. Note that if the user makes no scan settings via the screen shown in FIG. 8B, the CPU 201 performs a scan operation using the initial settings stored in advance.

If scan settings are made in step S703, the process advances to step S704. In step S704, the CPU 201 determines whether the user has pressed the monochrome start button 808 or the color start button 809 in the screen of FIG. 8B to issue a scan start instruction. If the start button has been pressed to input a scan start instruction, the process advances to step S705, and the CPU 201 starts a scan operation based on the settings accepted in step S703. The process advances to step S705, and the CPU 201 determines whether or not a document is placed on an ADF (Auto Document Feeder included in the scanner 215). If the document is placed on the ADF, the process advances to step S706; otherwise, the process advances to step S708. In step S706, the CPU 201 starts an ADF scan (flow reading scan) operation. If all the pages of the document are scanned in step S707, the process advances to step S711.

On the other hand, in step S708, the CPU 201 starts a BOOK scan (document table scan) operation. During execution of the scan, the CPU 201 displays, in step S709, on the display unit 207, a message 810 indicating that the scan operation is in progress, as shown in, for example, FIG. 8C. At this time, if the user wants to stop the scan halfway, he/she presses a stop button 811. If the stop button 811 is pressed, the screen returns to that shown in FIG. 8B (the process returns to step S703 although not shown in the flowchart of FIG. 7). If the scan ends in step S710, the process advances to step S711.

Figure 9:
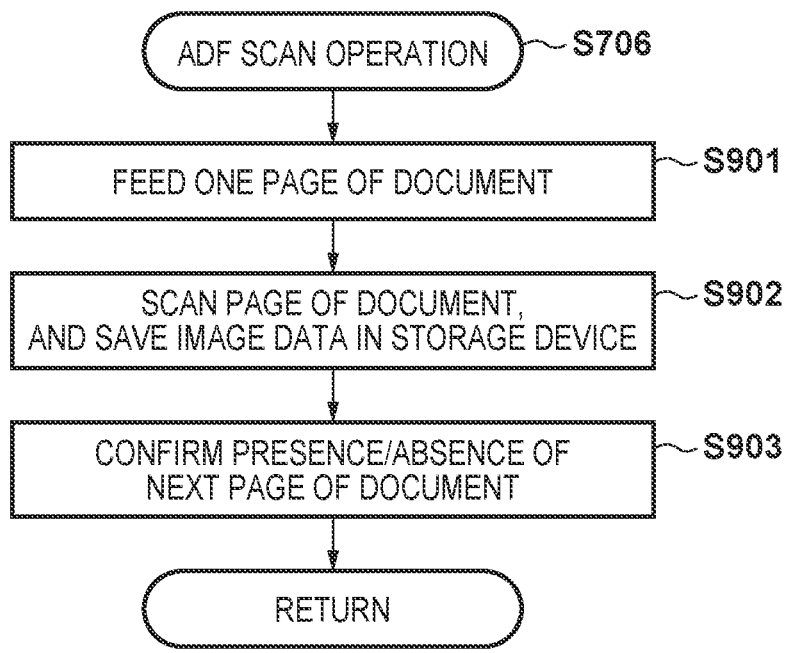
FIG. 9 is a flowchart for describing an ADF scan operation in step S706 of FIG. 7.

FIG. 9 is a flowchart for describing the ADF scan operation in step S706 of FIG. 7.

This ADF scan indicates a scan operation of scanning a document by an image sensor (for example, a CIS: Contact Image Sensor (not shown)) whose position is fixed while feeding the pages of the document one by one by an ADF motor (not shown).

In step S901, the CPU 201 feeds the pages of the document one by one. In step S902, the image sensor scans an image of the page, and holds it as image data in the storage device 204. This image data may be held in, for example, the RAM 202 instead of the storage device 204. After the scan of the image of the one page ends, the CPU 201 confirms, in step S903, the presence/absence of the next page of the document. Then, the subroutine of the ADF scan operation ends to return to the main flowchart.

Referring back to FIG. 7, a continuation of the main flowchart will be described. If, as a result of confirming the presence/absence of the next page of the document in the ADF scan operation, it is determined that there is the next page of the document, the process returns from step S707 to step S706 to repeat the ADF scan operation. On the other hand, if it is determined that there is no next page of the document, and all the pages of the placed document have been scanned, the process advances from step S707 to step S711.

The BOOK scan operation when it is determined in step S705 that no document is placed on the ADF will be described next.

Figure 10:
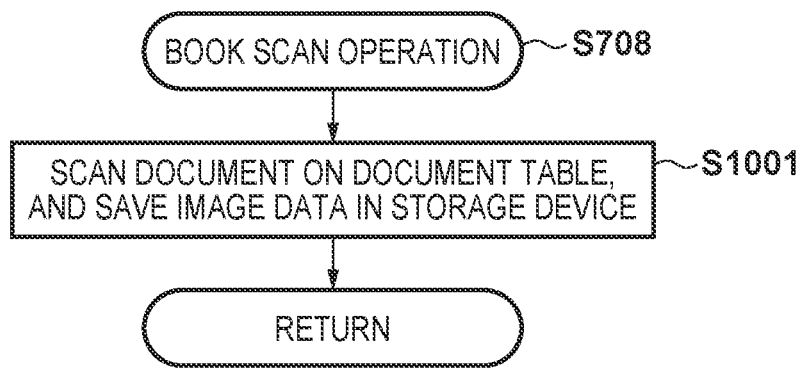
FIG. 10 is a flowchart for describing a BOOK scan operation in step S708 of FIG. 7.

FIG. 10 is a flowchart for describing the BOOK scan operation in step S708 of FIG. 7.

In step S1001, the CPU 201 scans the document placed on the document table (platen glass; not shown) by scanning by an image sensor such as a CIS, thereby obtaining the scanned data as image data. The CPU 201 holds the obtained image data in the storage device 204 or the RAM 202, similarly to the ADF scan operation. Then, the process ends.

Referring back to FIG. 7, after exiting the BOOK scan operation in step S708, the process advances to step S709, and a message 812 (FIG. 8D) to inquire about whether there is a subsequent page of the document is displayed on the display unit 207, and a user instruction is received.

FIG. 8D depicts a view showing an example of screen display at this time.

When instructing to scan the next page of the document, the user presses a "next page scan" button 813. If the user issues a scan start instruction for the next page of the document in step S710, the process returns from step S710 to step S708, and the BOOK scan operation is repeatedly executed, thereby holding the obtained image data in the storage device 204 or the like. On the other hand, if there is no next page of the document, and the scan is to be completed, the user presses a "scan completion" button 814. Then, the CPU 201 advances the process from step S710 to step S711.

As described with reference to FIG. 8C, when stopping the scan operation, the user presses the stop button 811. In this case, the process returns to step S703 (which is not shown in the flowchart of FIG. 7), as described above.

In step S711, the CPU 201 executes processing of transmitting the scanned image data to the mobile terminal 101 via TransferJet.

Figure 11:
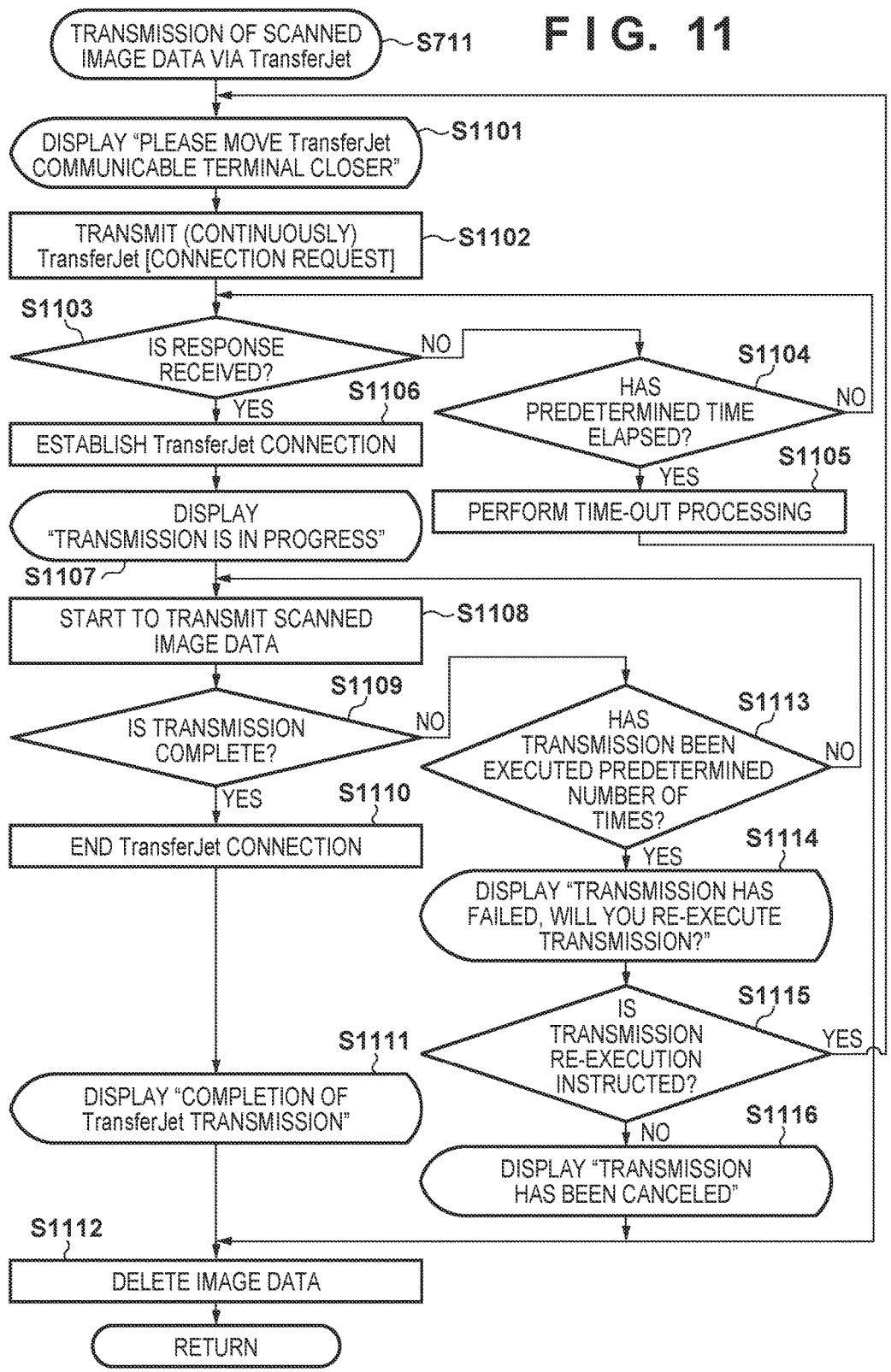
FIG. 11 is a flowchart for describing processing in which the image forming apparatus transmits scanned image data to the mobile terminal via TransferJet in step S711 of FIG. 7 according to the first embodiment.

FIG. 11 is a flowchart for describing the processing in which the image forming apparatus 100 transmits the scanned image data to the mobile terminal 101 via TransferJet in step S711 of FIG. 7 according to the first embodiment.

In step S1101, the CPU 201 displays, on the display unit 207, a message to prompt the user to move the short-range wireless communication device 102 connected to the mobile terminal 101 closer to the communicable area 103 of the image forming apparatus 100.

FIGS. 12A to 12D depict views respectively showing examples of a screen displayed on the display unit 207 while the image forming apparatus 100 executes the processing represented by the flowchart of FIG. 11 according to the first embodiment.

Figure 12A:
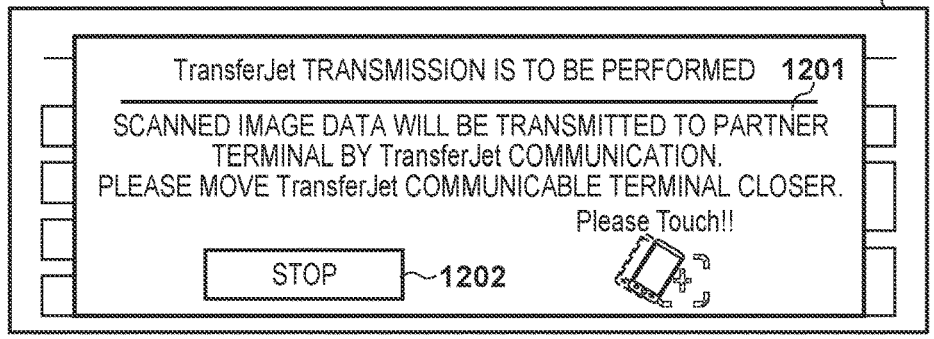
FIGS. 12A to 12D depict views respectively showing examples of a screen displayed on the display unit while the image forming apparatus executes the processing represented by the flowchart of FIG. 11 according to the first embodiment.

FIG. 12A depicts a view showing a display example in step S1101. As shown in FIG. 12A, a message 1201 to move a TransferJet communication-capable terminal closer is displayed. When stopping the transmission, the user presses a stop button 1202. Note that although not shown in the flowchart of FIG. 7, if the stop button 1202 is pressed, the process returns to the start (step S701) of FIG. 7.

The process advances to step S1102, the CPU 201 causes the TransferJet controller 223 to instruct the TransferJet module 224 to transmit a connection request signal to an external terminal (in this example, the short-range wireless communication device 102 of the mobile terminal 101). In step S1103, the CPU 201 determines the presence/absence of a response to the connection request. If the short-range wireless communication device 102 falls within the communicable area 103, and returns a response signal to the connection request, the process advances to step S1106. On the other hand, if no response is received, the process advances to step S1104. In step S1104, the CPU 201 determines whether or not a predetermined time has elapsed. If no response can be received even after the predetermined time elapses, the process advances to step S1105 to execute time-out processing. Then, the process advances to step S1112. This time-out processing displays, on the display unit 207, a message indicating that detection of an external terminal has failed, thereby notifying that the process abnormally ends. Alternatively, although not shown in FIG. 11, the process may be retried from step S1101. The predetermined time is preferably set to, for example, about 10 sec.

If a response is received and the process advances to step S1106, the CPU 201 establishes TransferJet communication connection. If TransferJet communication is established, the process advances to step S1107, and the CPU 201 displays, on the display unit 207, a message indicating that the image data is currently transmitted by TransferJet communication, and sends a notification to maintain the mobile terminal 101 within the communicable area.

Figure 12B:
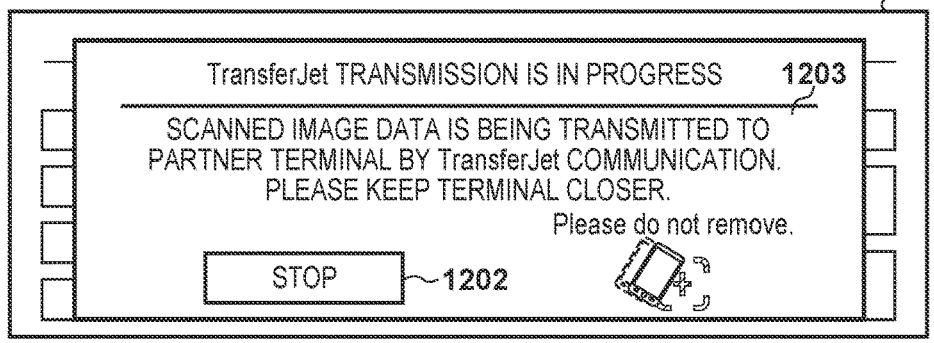

FIG. 12B shows an example of a message indicating that data transmission by TransferJet is in progress, that is displayed on the display unit 207 in step S1107.

As indicated by a message 1203 shown in FIG. 12B, a message to maintain the mobile terminal 101 within the communicable area 103 during TransferJet communication is displayed.

The process advances to step S1108, and the CPU 201 starts processing of transmitting, by TransferJet communication, the image data held in the storage device 204 in step S706 or S708. Then, the process advances to step S1109. Upon completion of transmission of the scanned image data in step S1109, the process advances to step S1110 to end the TransferJet communication connection. The process then advances to step S1111, and the CPU 201 displays, on the display unit 207 of the image forming apparatus 100, a message indicating completion of transmission of the scanned image data.

Figure 12C:
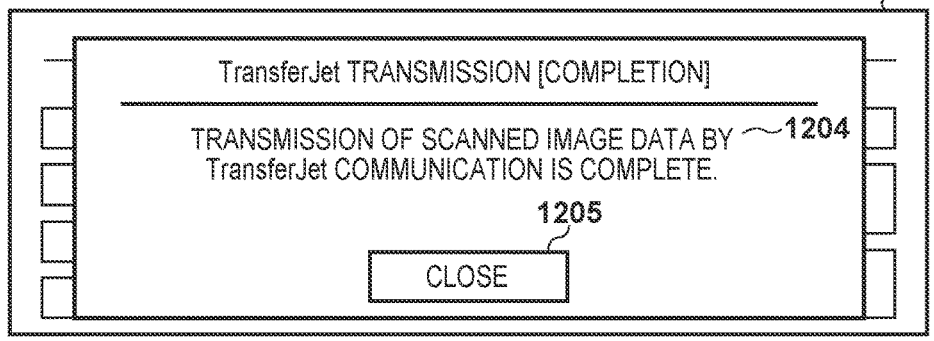

FIG. 12C shows an example of a message displayed on the display unit 207 when TransferJet transmission is complete.

As indicated by a message 1204, a message indicating completion of transmission of data by TransferJet communication is displayed. If display of this message is canceled, the user presses a close button 1205.

In the first embodiment, in step S1112, the CPU 201 deletes the scanned image data held in the storage device 204, thereby returning to the main flowchart.

On the other hand, if transmission of the image data is not complete in step S1109, the process advances to step S1113, and the CPU 201 determines whether or not data transmission has been executed a predetermined number of times. If data transmission has not been executed the predetermined number of times, the process returns to step S1108 to continue data transmission. On the other hand, if it is determined in step S1113 that data transmission has been executed the predetermined number of times, the process advances to step S1114, and the CPU 201 displays, on the display unit 207, a message to notify that transmission of the image data has failed. At the same time, a message to inquire about whether to re-execute or cancel data transmission is displayed on the display unit 207 to prompt the user to send an instruction.

Figure 12D:
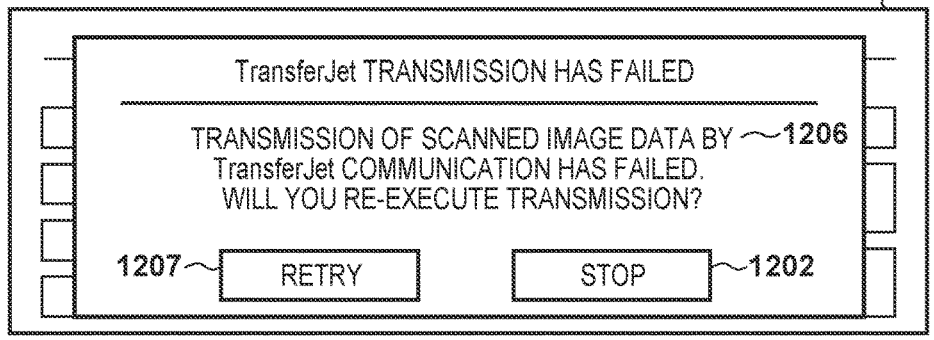

FIG. 12D depicts a view showing an example of the message displayed on the display unit 207 in step S1114.

As indicated by a message 1206, options of whether to re-execute (retry button 1207) or stop (stop button 1202) data transmission are displayed together with the message indicating that transmission has failed. If an instruction to re-execute data transmission is received from the user via the console unit 209, the process advances from step S1115 to step S1101 to re-execute the above-described processing. On the other hand, if a cancel instruction is received, the process advances from step S1115 to step S1116, and the CPU 201 displays, on the display unit 207, a message indicating that the transmission cancel instruction has been accepted. Then, the process advances to step S1112 (a display example when the cancel instruction is received is not shown).

Upon completion of all the processes of the subroutine of TransferJet transmission, the process returns to the main flowchart (FIG. 7) to end the series of processes of the TransferJet scan.

The above-described processing of the mobile terminal 101 that receives the image data transmitted by TransferJet communication will be explained next with reference to flowcharts shown in FIGS. 13A and 13B.

Figure 13B:
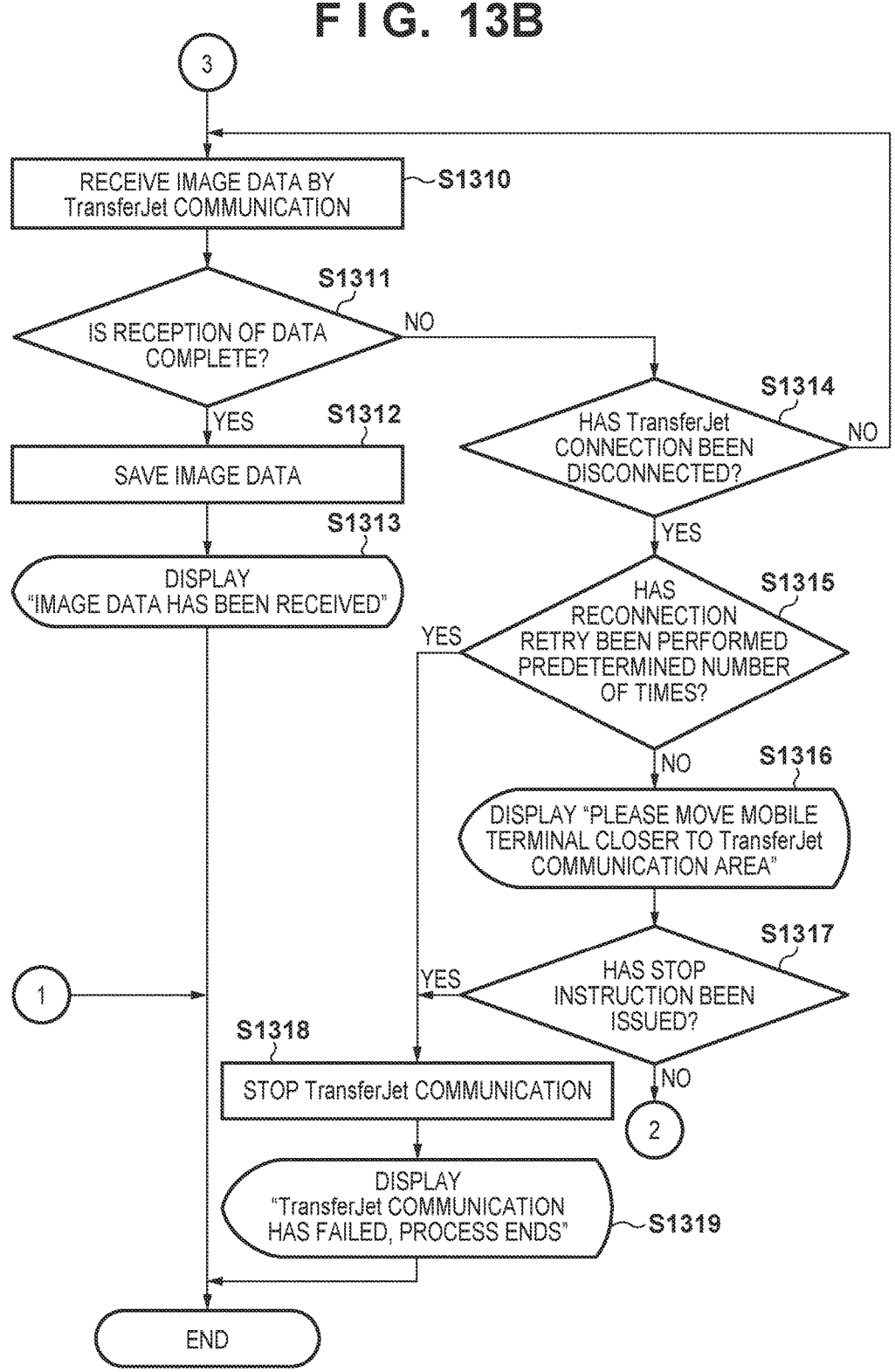

FIGS. 13A and 13B are flowcharts for describing processing in which the mobile terminal 101 receives the image data transmitted from the image forming apparatus 100 according to the first embodiment. Note that the processing represented by these flowcharts is implemented when the CPU 301 executes a program deployed from the storage device 304 in the RAM 302. Note that this processing starts when the scan function button 501 is pressed in the initial screen of the cooperative application 400 shown in FIG. 5A.

In step S1301, the CPU 301 executes the switching processing of the scan function screen in accordance with the flowchart of FIG. 6 described above. The first embodiment will describe a case in which the TransferJet scan is enabled. If no short-range wireless communication device 102 is connected to the mobile terminal 101, it is impossible to execute the TransferJet scan. The process advances to step S1302, and the CPU 301 determines whether or not the TransferJet scan button 505 has been pressed in the scan function screen shown in FIG. 5B. If the TransferJet scan button 505 has not been pressed, the process advances to step S1303. If another scan function button has been pressed, the process advances from step S1303 to step S1304, and processing corresponding to the button is executed, thereby ending the process. However, a description thereof will be omitted.

On the other hand, if it is determined in step S1302 that the TransferJet scan button 505 has been pressed, the process advances to step S1305. In step S1305, the CPU 301 displays, on the display unit 307, a message to prompt the user to move the mobile terminal 101 (more exactly, the short-range wireless communication device 102 connected to the mobile terminal 101) to the TransferJet communicable area 103 of the image forming apparatus 100.

Figure 5D:
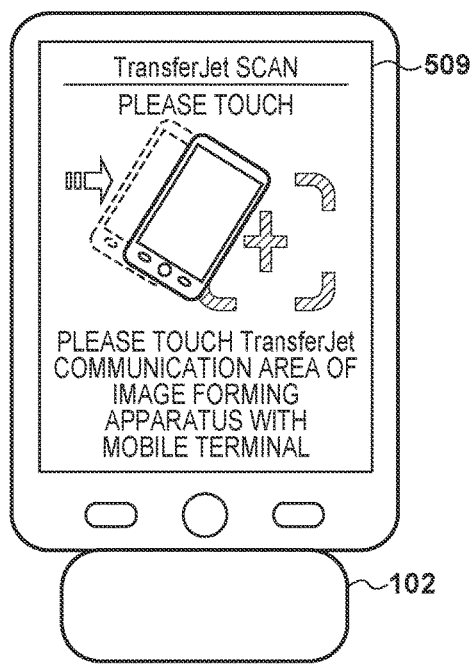

FIG. 5D depicts a view showing an example of a screen 509 displayed in step S1305. Referring to FIG. 5D, the user is prompted to touch the TransferJet communicable area 103 of the image forming apparatus 100 with the mobile terminal 101.

The process advances to step S1306, and the CPU 301 instructs the short-range wireless communication device 102 to detect a TransferJet connection request while displaying the screen 509 on the display unit 307. If the short-range wireless communication device 102 detects the connection request, the process advances from step S1307 to step S1308, and the CPU 301 establishes TransferJet communication connection. On the other hand, if no connection request can be detected in step S1307, the processes in steps S1306 and S1307 are repeated until a connection request is detected. Note that although not shown in FIGS. 13A and 13B, a predetermined time-out time may be set. If the time-out time elapses, detection of a connection request may be stopped, and a message indicating that TransferJet communication has failed may be displayed on the display unit 307, thereby ending the process.

If TransferJet communication is established in step S1308, the process advances to step S1309, and the CPU 301 displays, on the display unit 307, a message indicating that TransferJet communication is in progress. At the same time, a screen 510 including a message to prompt the user not to move the mobile terminal 101 from the communicable area is displayed.

Figure 5E:

FIG. 5E depicts a view showing a practical example of the screen 510 displayed in step S1309.

In this way, the user is prompted to keep the mobile terminal 101 (the short-range wireless communication device 102 connected to the mobile terminal 101) within the TransferJet communicable area 103 of the image forming apparatus 100. The process advances to step S1310, and the CPU 301 receives, via the short-range wireless communication device 102, the scanned image data transmitted from the image forming apparatus 100. The process advances to step S1311, and the CPU 301 determines whether or not reception of the scanned image data is complete. If it is determined that the reception is complete, the process advances to step S1312 to save the received image data in a predetermined storage destination (folder). After that, the process advances to step S1313, and the CPU 301 displays, on the display unit 307, a message to notify that reception of the image data is complete, thereby ending the process.

Figure 5F:
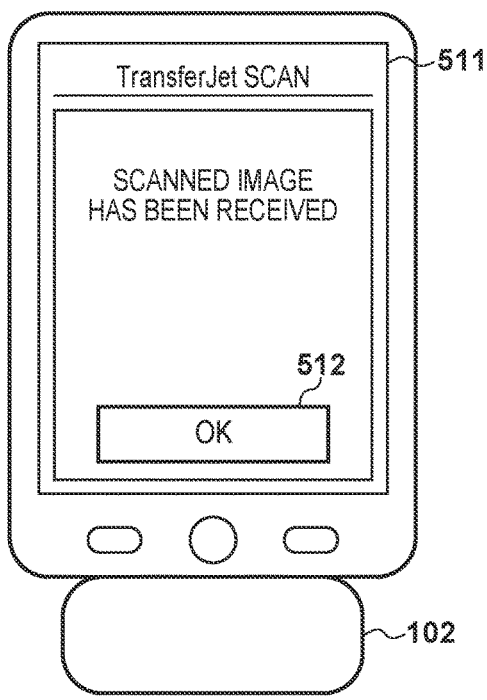

FIG. 5F depicts a view showing an example of a screen 511 displayed when reception of the scanned image data successfully ends. Note that the predetermined storage destination (folder) is determined by the scanned data control module 402 of the cooperative application 400, and is a storage destination designated in advance by the user. If the user has designated no storage destination, the storage destination is determined based on the initial settings of the cooperative application 400. If an OK button 512 is pressed in the screen 511, the screen is closed, and the reception processing ends.

On the other hand, if it is determined in step S1311 that reception of the scanned image data from the image forming apparatus 100 is not complete, the process advances to step S1314. In step S1314, the CPU 301 determines whether or not the TransferJet communication connection has been disconnected. If it is determined that the connection continues, the process returns to step S1310 to continue the reception of the image data. On the other hand, if it is determined in step S1314 that the TransferJet connection has been disconnected, the process advances to step S1315 and the CPU 301 determines whether or not a reconnection retry count has reached a predetermined number of times. If it is determined that the reconnection retry count has not reached the predetermined number of times, the process advances to step S1316, and the CPU 301 displays again, on the display unit 307, the message to prompt the user to move the mobile terminal 101 closer to the TransferJet communicable area 103 of the image forming apparatus. If it is determined in step S1315 that the reconnection retry count has reached the predetermined number of times, the process advances to step S1318.

Figure 5G:
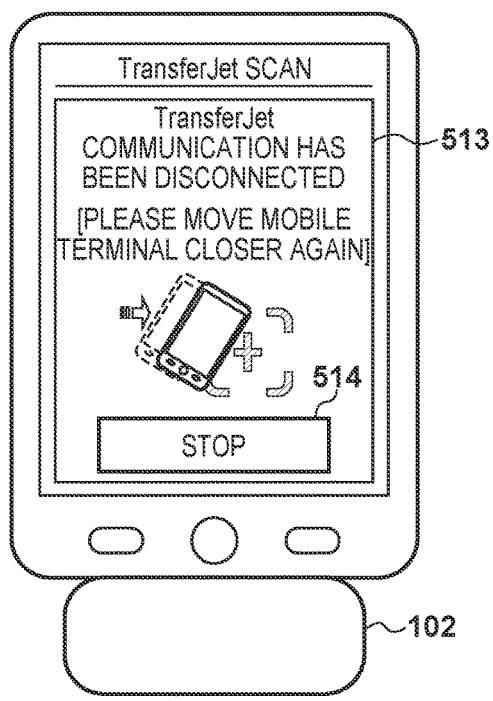

FIG. 5G depicts a view showing a practical example of a screen 513 displayed in step S1316. Note that if the user wants to stop the TransferJet communication, he/she presses a stop button 514.

The process advances to step S1317, and the CPU 301 determines the presence/absence of a TransferJet communication stop instruction. If the stop button 514 has been pressed to issue a stop instruction, the process advances to step S1318 to stop the TransferJet communication. The process then advances to step S1319, and the CPU 301 displays a message to end the TransferJet communication, thereby ending the process. On the other hand, if no stop instruction has been issued in step S1317, the process returns to step S1306.

Figure 5H:
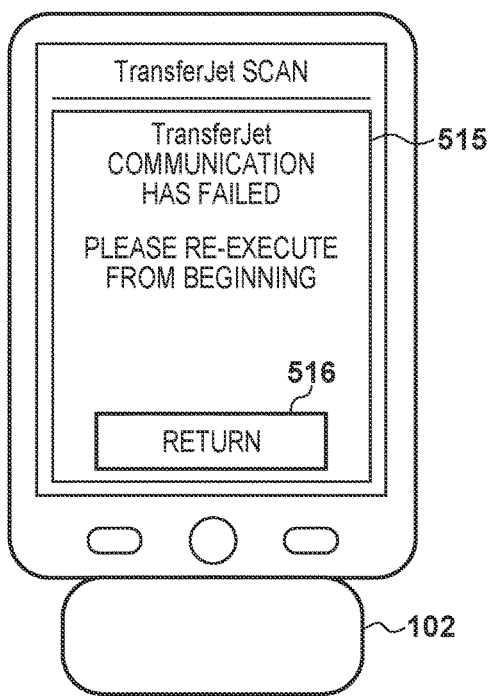

FIG. 5H depicts a view showing an example of a screen 515 displayed when the TransferJet communication is stopped. When re-executing the process from the beginning, the user presses a return button 516.

As described above, according to the first embodiment, the image forming apparatus 100 and the mobile terminal 101 cooperate with each other and the mobile terminal 101 can receive, by TransferJet communication, image data obtained by scanning by the image forming apparatus 100. It is possible to call attention to the user not to disconnect TransferJet connection by displaying a message to prompt the user not to move the mobile terminal 101 from the communication area during the TransferJet communication.

[Second Embodiment]

Figure 14:
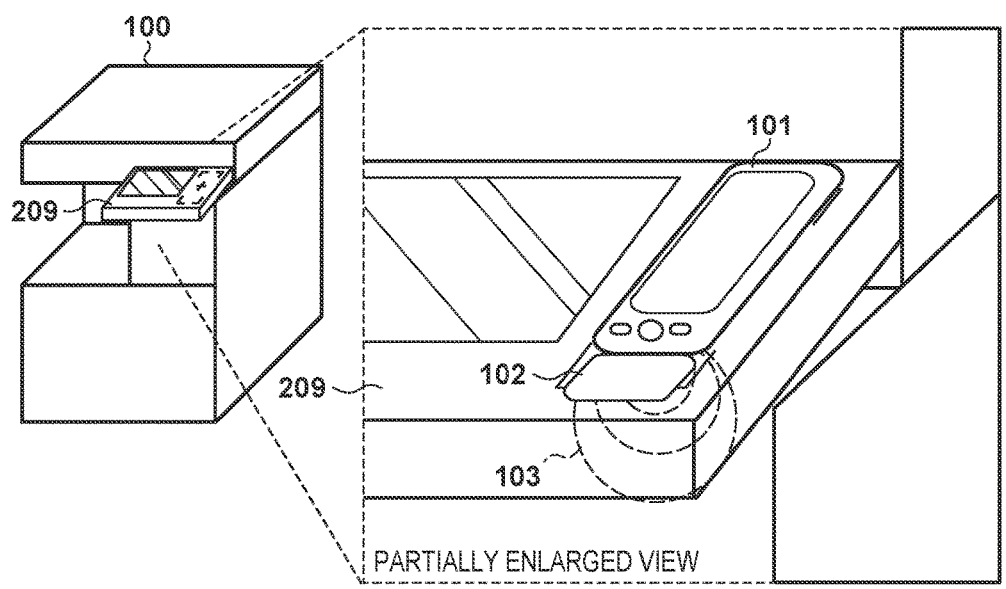
FIG. 14 depicts a view showing the positional relationship among an image forming apparatus, a mobile terminal, and a short-range wireless communication device according to the second embodiment of the present invention.

FIG. 14 depicts a view showing the positional relationship among an image forming apparatus 100, a mobile terminal 101, and a short-range wireless communication device 102 according to the second embodiment of the present invention. FIG. 14 shows an embodiment in which the mobile terminal 101 is used while being placed so that the short-range wireless communication device 102 connected to the mobile terminal 101 falls within a TransferJet communicable area 103 of the image forming apparatus 100. Note that the hardware arrangements of the image forming apparatus 100, mobile terminal 101, and short-range wireless communication device 102 and the arrangement of a system including these devices according to the second embodiment are the same as in the above-described first embodiment and a description thereof will be omitted.

Figure 15A:
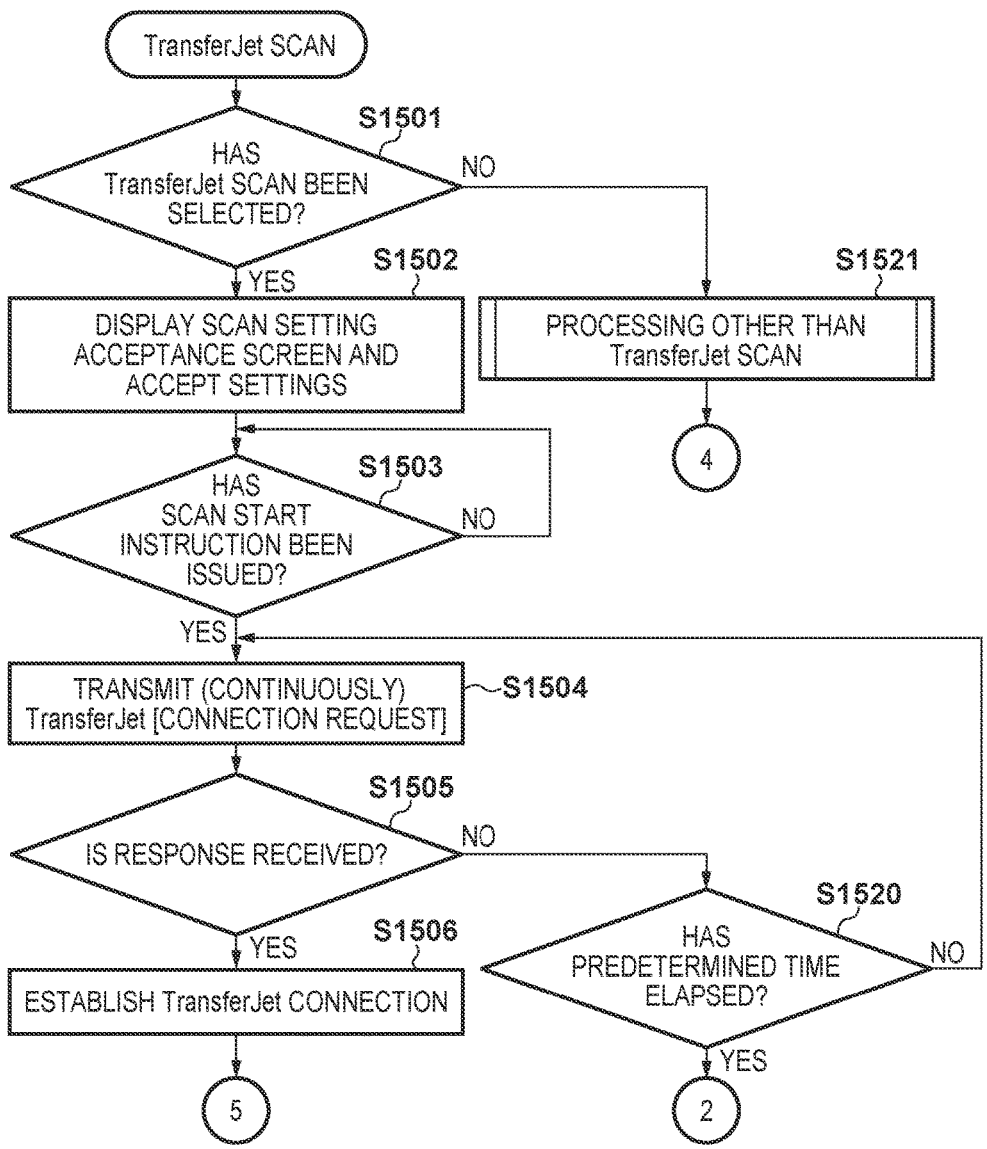
FIGS. 15A and 15B are flowcharts for describing processing of a TransferJet scan executed by the image forming apparatus according to the second embodiment.
Figure 15B:
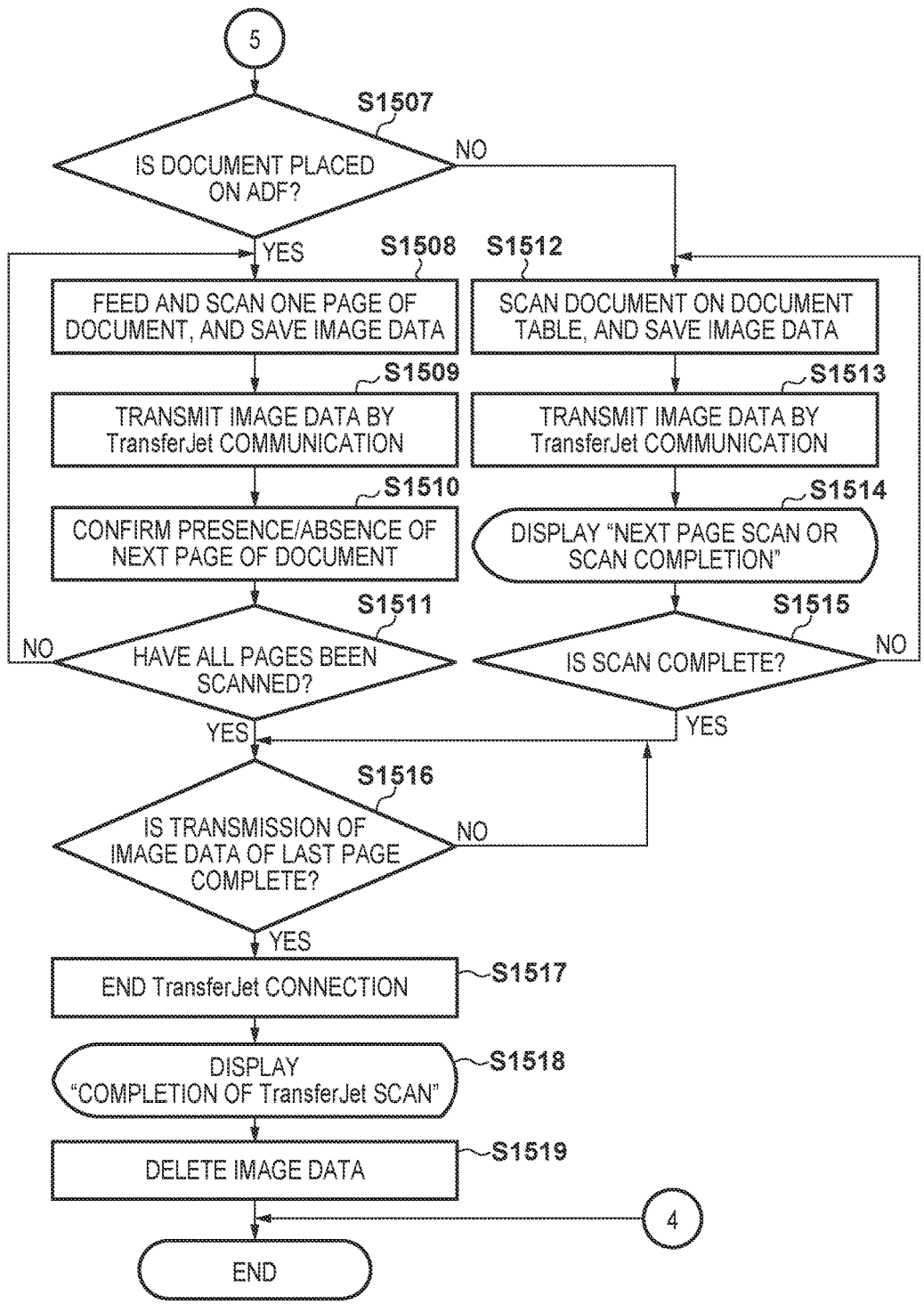

FIGS. 15A and 15B are flowcharts for describing the processing of a TransferJet scan executed by the image forming apparatus 100 according to the second embodiment. Note that the processing represented by these flowcharts is implemented when a CPU 201 executes a program deployed from a storage device 204 in a RAM 202.

In this example as well, when executing the TransferJet scan, the user uses the mobile terminal 101 to which the short-range wireless communication device 102 is connected (or the mobile terminal 101 incorporating the short-range wireless communication device 102) by placing it within the TransferJet communicable area 103 of the image forming apparatus 100, as shown in FIG. 14. Processes in steps S1501 to S1503 and S1521 of FIGS. 15A and 15B are the same as those in steps S701 to S704 of FIG. 7.

In step S1501, the CPU 201 determines whether or not a TransferJet scan has been selected in FIG. 8A from the scan functions of the image forming apparatus 100. If the scan function other than the TransferJet scan has been selected, the process advances to step S1521 to execute scan processing other than the TransferJet scan, thereby ending the process. A detailed description of scan processes other than the TransferJet scan will be omitted.

On the other hand, if the CPU 201 determines in step S1501 that the TransferJet scan has been selected, the process advances to step S1502, and the CPU 201 displays a scan setting acceptance screen shown in FIG. 8B, and accepts a setting instruction from the user, similarly to step S703 of FIG. 7. Upon completion of the scan setting, the CPU 201 determines in step S1503 whether or not a scan start instruction has been issued by a button 808 or 809. If the scan start instruction has been issued, the process advances to step S1504, and the CPU 201 transmits a connection request for TransferJet communication. The difference from the first embodiment (FIG. 7) is that a connection request for TransferJet communication is transmitted in step S1504 before a scan operation. The process advances to step S1505, and the CPU 201 determines whether or not a response to the connection request is received. If it is determined that the response is received, the process advances to step S1506 to establish TransferJet connection.

On the other hand, if no response to the connection request can be received, the process advances to step S1520, and the CPU 201 repeats transmission of the connection request during a predetermined time (time-out time). If no response can be received even after the predetermined time elapses, the process advances to step S705 of FIG. 7. In this case, subsequent processes are the same as in the flowchart shown in FIG. 7 described in the first embodiment.

If TransferJet communication connection is established in step S1506, the process advances to a scan operation. In step S1507, the CPU 201 determines whether or not a document is placed on an ADF (Auto Document Feeder: which is included in the scanner 215). If it is determined that a document is placed on the ADF, the process advances to step S1508; otherwise, the process advances to step S1512.

A case in which a document is placed on the ADF will be described first. An ADF scan is a scan operation of scanning the document by an image sensor whose position is fixed while feeding the pages of the document one by one by an ADF motor. Therefore, in step S1508, the pages of the document are fed one by one, an image of the page of the document is scanned by the image sensor, and obtained data is held as image data in a storage device 204. The image data may be stored in, for example, the RAM 202 instead of the storage device 204. If the scanned image data of the one page of the document is stored, the process advances to step S1509, and the CPU 201 transmits the image data to the partner terminal (mobile terminal 101) by TransferJet communication. After transmission of the image data of the one page ends, the process advances to step S1510, and the CPU 201 confirms the presence/absence of the next page of the document. If it is determined that there is the next page of the document, the process returns from step S1511 to step S1508 to repeat the above-described processing. If it is determined in step S1511 that there is no next page of the document and all the pages of the placed document have been scanned, the process advances to step S1516.

A case in which it is determined in step S1507 that no document is placed on the ADF will be described next.

In this case, the process advances to step S1512 to execute a BOOK scan operation. In the BOOK scan operation, a document placed on a document table is scanned by an image sensor such as a CIS, thereby obtaining the scanned data as image data. The thus obtained image data is held in the storage device 204 or the RAM 202 in step S1512, similarly to the ADF scan operation. The process then advances to step S1513, and the CPU 201 transmits the image data to the partner terminal (mobile terminal 101) by TransferJet communication. After transmission of the image data of the one page ends, the process advances to step S1514, and the CPU 201 displays, on a display unit 207, a message to inquire about whether there is the next page of the document, and receives a user instruction. An example of a screen displayed in step S1514 is as shown in FIG. 8D described above. When instructing to scan the next page of the document, the user presses a "next page scan" button 813. If the user inputs a scan start instruction for the next page of the document, the process returns from step S1515 to step S1512 to execute the BOOK scan operation.

On the other hand, if there is no next page of the document, and the scan is to be completed, the user presses a scan completion button 814. At this time, the process advances from step S1515 to step S1516. If the user wants to stop the scan operation, he/she presses a stop button 811. In this case, as described above, the process returns to step S1502 (which is not shown in the flowcharts of FIGS. 15A and 15B).

Upon completion of the scan of all the pages of the document, the process advances to step S1516, and the CPU 201 determines whether or not data transmission of the last page by TransferJet communication is complete. Step S1516 is repeated until data transmission is completed. If the data transmission is complete, the process advances to step S1517 to end the TransferJet communication connection. The process then advances to step S1518, and the CPU 201 displays, on the display unit 207, a message indicating completion of the TransferJet scan. The process advances to step S1519, and the CPU 201 deletes the image data saved in the storage device 204 or the RAM 202, thereby ending the process.

As described above, according to the second embodiment, when transmitting image data from the image forming apparatus 100 to the mobile terminal 101 while the mobile terminal 101 is placed within the TransferJet communicable area 103 of the image forming apparatus 100, the display shown in FIG. 12A can be eliminated.

[Third Embodiment]

An image forming apparatus 100 according to the third embodiment of the present invention will be described next. The third embodiment will be described as another embodiment of the processing of transmitting the scanned image data to the partner terminal (mobile terminal 101) by TransferJet communication, which has been explained with reference to FIG. 11. Note that the hardware arrangements of an image forming apparatus 100, mobile terminal 101, and short-range wireless communication device 102 and the arrangement of a system including these devices according to the third embodiment are the same as in the above-described first embodiment and a description thereof will be omitted.

Figure 16A:
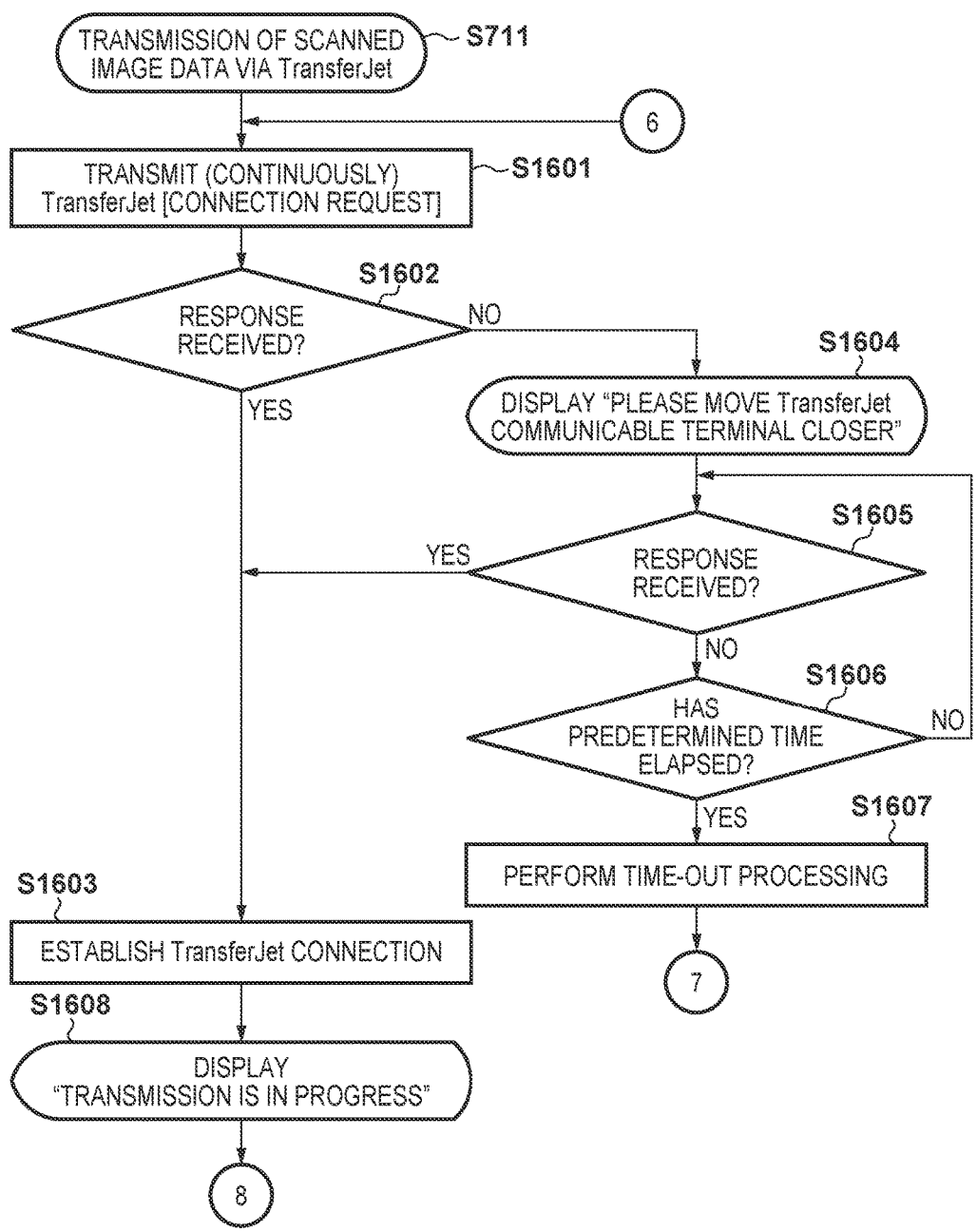

FIGS. 16A and 16B are flowcharts for describing processing in which the image forming apparatus 100 transmits scanned image data to the mobile terminal 101 via TransferJet in step S711 of FIG. 7 according to the third embodiment. Note that the main processing of the image forming apparatus 100 is in common with the flowchart of FIG. 7 described in the first embodiment, and a part of transmission using TransferJet communication will be described as another embodiment.

In step S1601, a CPU 201 instructs a TransferJet controller 223 and a TransferJet module 224 to transmit a connection request signal to the partner terminal (mobile terminal 101). If the mobile terminal 101 falls within a communicable area 103, and returns a response signal to the connection request, the process advances from step S1602 to step S1603. On the other hand, if no response can be received immediately, the process advances to step S1604, and the CPU 201 displays, on a display unit 207, a message to prompt the user to move the short-range wireless communication device 102 connected to the mobile terminal 101 closer to the communicable area 103 of the image forming apparatus 100. A practical screen displayed at this time is as shown in FIG. 12A described above. After displaying the message in step S1604, the process advances to step S1605, and the CPU 201 determines again whether or not a response to the connection request for TransferJet communication is received. If it is determined that no response can be received, the process advances to step S1606 to determine whether or not a predetermined time has elapsed. If the predetermined time has not elapsed, the process advances to step S1605 to wait for reception of a response. If no response can be received even after the predetermined time elapses, the process advances to step S1607 to execute time-out processing. Then, the process advances to step S1613. The time-out processing is the same as that described in the first embodiment.

On the other hand, if a response is received within the predetermined time in step S1605, the process advances to step S1603. In step S1603, the CPU 201 establishes TransferJet communication connection. If the connection is established, the process advances to step S1608, and the CPU 201 displays, on the display unit 207, a message indicating that the image data is currently transmitted by TransferJet communication, and sends a notification to maintain the mobile terminal 101 within the communicable range. An example of the message displayed at this time is as shown in FIG. 12B. After displaying the message, the process advances to step S1609, and the CPU 201 starts to transmit, by TransferJet communication, the image data held in a storage device 204. In step S1610, the CPU 201 determines whether or not transmission of the scanned image data is complete. If the transmission is complete, the process advances to step S1611 to end the TransferJet communication connection. The process advances to step S1612, and the CPU 201 displays, on the display unit 207, a notification indicating that transmission of the scanned image data is complete. FIG. 12C shows an example of a message displayed on the display unit 207 at this time. Next, in step S1613, the CPU 201 deletes the scanned image data held in the storage device 204, thereby ending the process.

On the other hand, if it is determined in step S1610 that the transmission of the image data is not complete, the process advances to step S1614, and the CPU 201 determines whether or not transmission (retry) has been executed a predetermined number of times. If a transmission (retry) count has not reached the predetermined number of times, the process advances to step S1609 to execute the above-described processing. If it is determined in step S1614 that the transmission (retry) count has reached the predetermined number of times, the process advances to step S1615, and the CPU 201 displays, on the display unit 207, a message to notify that transmission of the image data has failed. At the same time, a message to inquire about whether to re-execute or cancel transmission is displayed on the display unit 207 to prompt the user to send an instruction. A screen example at this time is as shown in FIG. 12D described above. Referring to FIG. 12D, as indicated by a message 1206, options of whether to re-execute (retry button 1207) or stop (stop button 1202) transmission are displayed together with the message indicating that transmission has failed. If an instruction to re-execute transmission is received from the user via this screen, the process returns from step S1616 to step S1601 to re-execute the above-described processing. On the other hand, if an instruction to cancel transmission is received, the process advances from step S1616 to step S1617, and the CPU 201 displays, on the display unit 207, a message indicating that the cancel instruction has been accepted. Then, the process advances to step S1613 (a display example when the cancel instruction is received is not shown).

The difference between the above-described first embodiment and the third embodiment is that a message "please move the mobile terminal 101 closer" is displayed in advance to the user on the display unit 207 of the image forming apparatus 100 in step S1604 in the third embodiment.

In the first embodiment, the message is displayed before the start of transmission of the connection request for TransferJet communication. To the contrary, in the third embodiment, if a response is received immediately after the start of transmission of a connection request, connection is established in step S1603, and transmission of the image data starts in step S1609. Only if no response can be received in step S1602, the message to prompt the user to move the mobile terminal 101 closer is displayed in step S1604.

If, as shown in FIG. 14, the mobile terminal 101 is placed so that the short-range wireless communication device 102 connected to the mobile terminal 101 falls within the TransferJet communicable area 103 of the image forming apparatus 100, this screen display can be eliminated. If the screen display can be eliminated, the procedure by the user is eliminated, thereby making it possible to transit to scan processing more quickly.

[Fourth Embodiment]

The fourth embodiment of the present invention will be described next with reference to FIGS. 17A, 17B, 18A and 18B. In the fourth embodiment, some processes are added to the TransferJet scan by the image forming apparatus 100 described in the first embodiment. In the processing of the TransferJet scan described in the first embodiment, a temporal difference is generated between the timing of instructing the scan start and the timing of performing TransferJet communication at last. For example, assume that a user who has issued the scan start instruction moves away from the image forming apparatus 100 while scanning the document by the scanner 215. In this case, while the user who has issued the scan start instruction is absent, another user may receive transmission of scanned image data using a TransferJet communicable mobile terminal. If the other user receives transmission of scanned image data maliciously, this is theft of the scanned image data.

In a TransferJet scan according to the fourth embodiment, processing for ensuring that a user who has issued a scan start instruction is reliably identical to a user who receives transmission of image data by TransferJet communication is added. Note that the hardware arrangements of an image forming apparatus 100, mobile terminal 101, and short-range wireless communication device 102 and the arrangement of a system including these devices according to the fourth embodiment are the same as in the above-described first embodiment and a description thereof will be omitted.

Figure 17A:
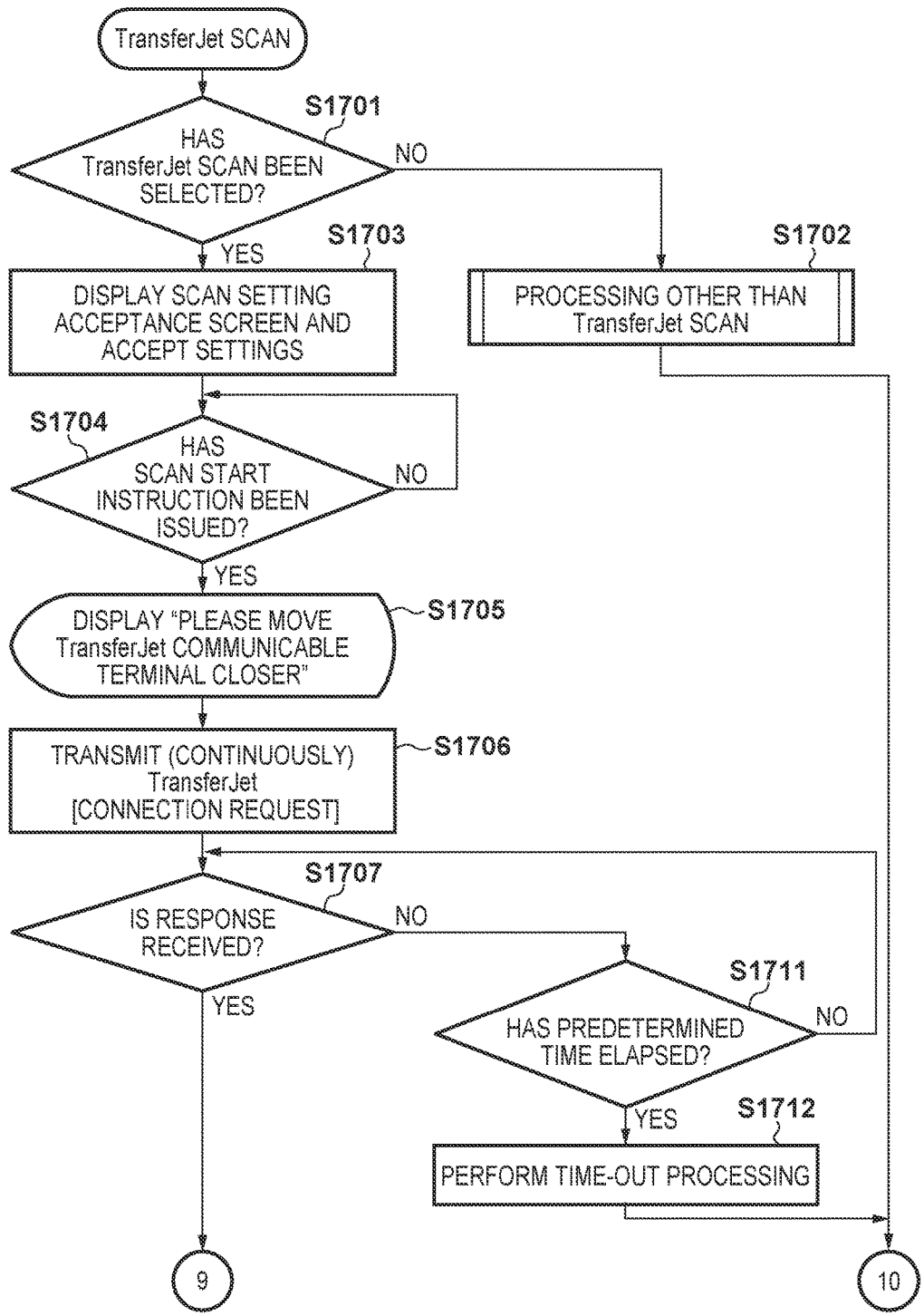
FIGS. 17A and 17B are flowcharts for describing processing of a TransferJet scan executed by an image forming apparatus according to the fourth embodiment.
Figure 17B:
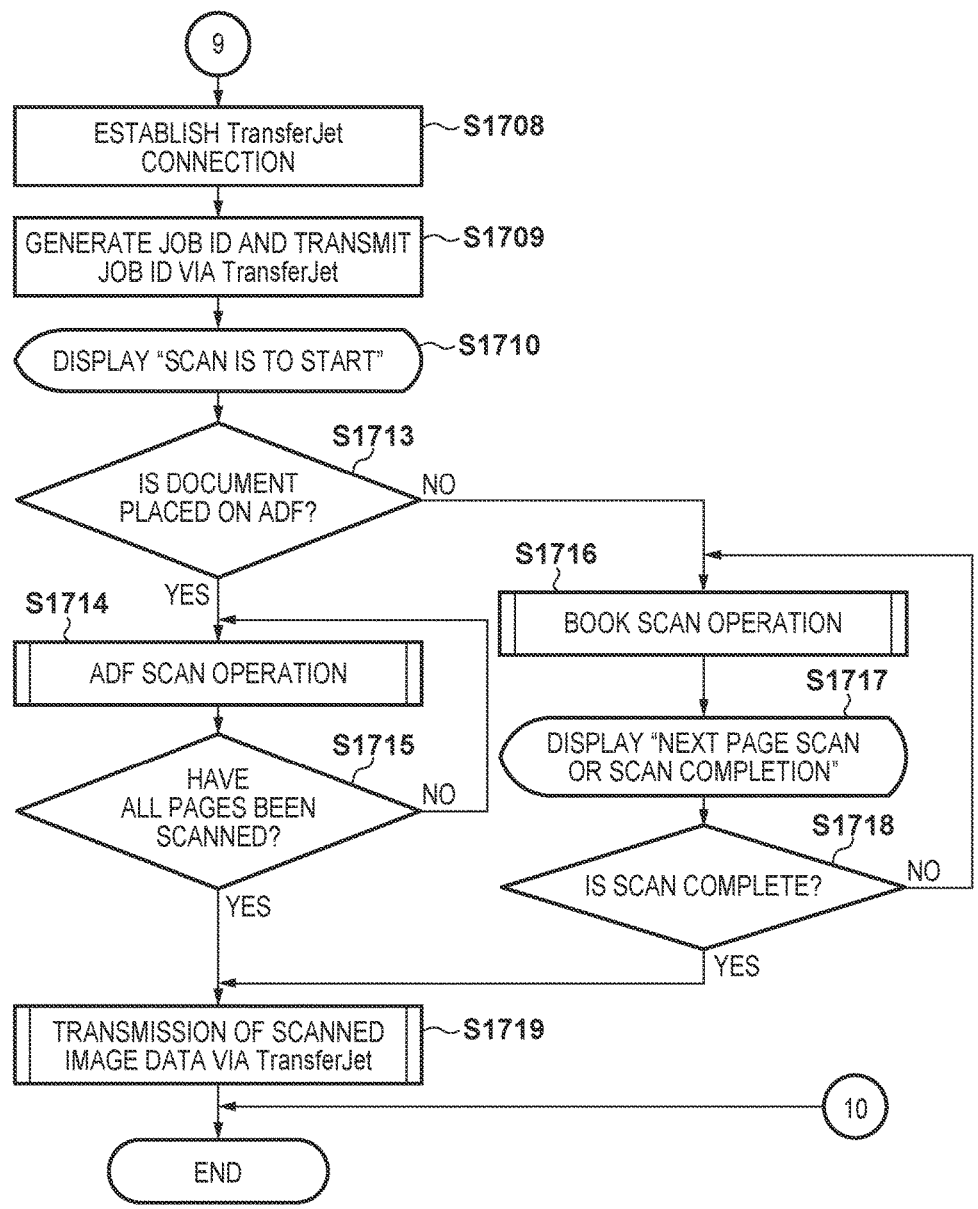

FIGS. 17A and 17B are flowcharts for describing the processing of the TransferJet scan executed by the image forming apparatus 100 according to the fourth embodiment. Note that the processing represented by these flowcharts is implemented when a CPU 201 executes a program deployed from a storage device 204 in a RAM 202. Note that processes in steps S1701 to S1704 of FIG. 17A are the same as those described with reference to FIG. 7 according to the first embodiment. Furthermore, processes in steps S1711 and S1712 are the same as those in steps S1104 and S1105 of FIG. 11 described above, and a description thereof will be omitted.

If the CPU 201 determines in step S1704 that the scan start instruction is received, the process advances to step S1705, and the CPU 201 displays, on a display unit 207, a message to prompt the user to move the short-range wireless communication device 102 connected to the mobile terminal 101 closer to the communicable area 103 of the image forming apparatus 100. A practical display example is as described above with reference to FIG. 12A. The process advances to step S1706, and the CPU 201 transmits a connection request for TransferJet communication. In step S1707, the CPU 201 determines whether or not a response to the connection request is received. If it is determined that a response is received, the process advances to step S1708 to establish TransferJet communication.

The process advances to step S1709 as the feature of the fourth embodiment, and the CPU 201 generates a scan job ID, and transmits the generated ID to the partner terminal (mobile terminal 101) via TransferJet communication. Although not shown, a cooperative application 400 operating on the mobile terminal 101 holds, in a storage device 304 (or a RAM 302), the scan job ID received by TransferJet communication.

The process then advances to step S1710, and the CPU 201 displays, on the display unit 207, a message indicating that a scan operation is to start, and starts to scan a document. Subsequent processes of the scan operation in steps S1713 to S1718 are the same as those in steps S705 to S707 or S708 to S710 of FIG. 7 described above, and a description thereof will be omitted. Upon completion of the scan of all the pages of the document, the process advances to step S1719, and the CPU 201 transmits the scanned image data to the mobile terminal 101 by TransferJet communication, thereby ending the process.

Figure 18A:
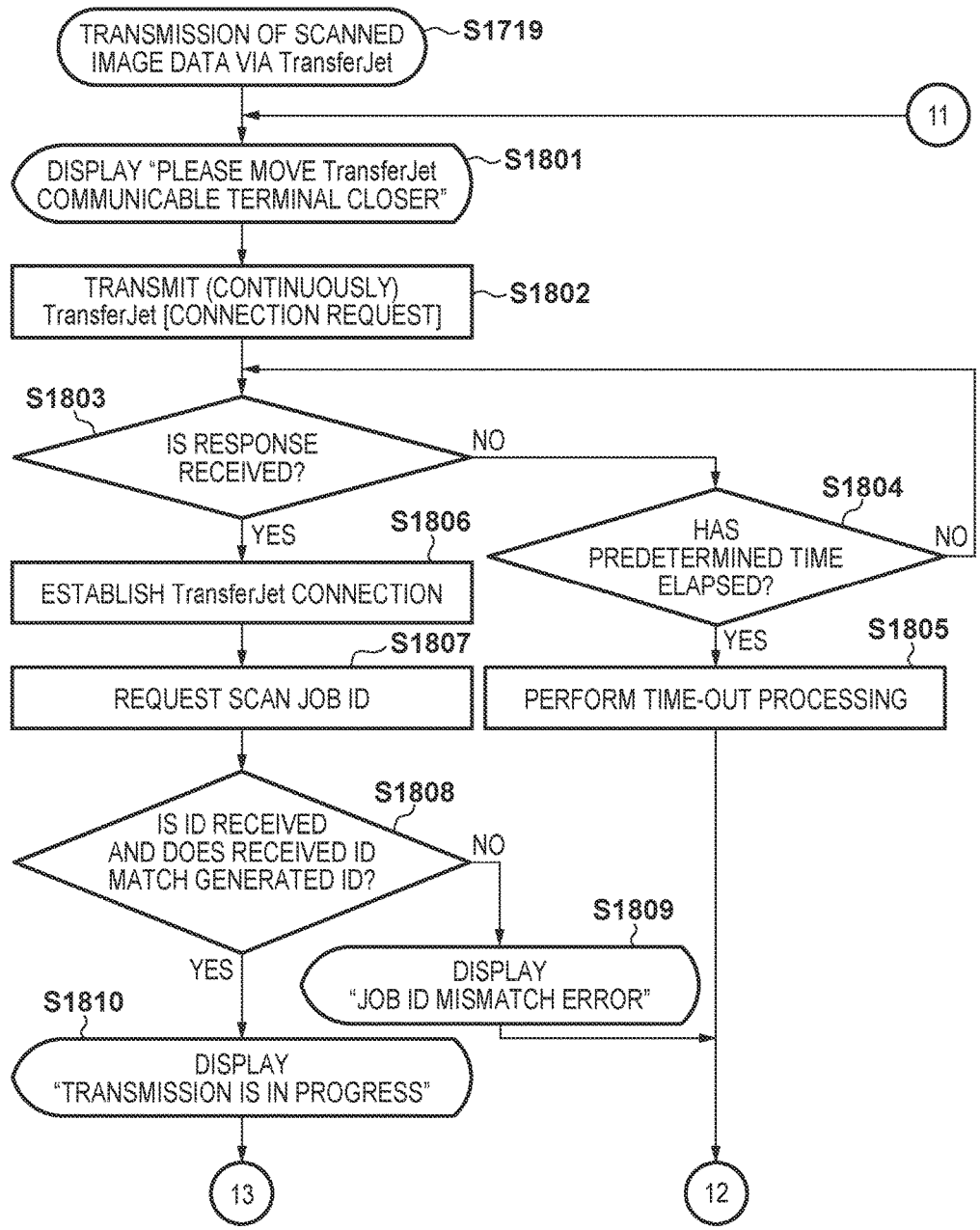

FIGS. 18A and 18B are flowcharts for describing the processing in which the image forming apparatus 100 transmits the scanned image data to the mobile terminal 101 via TransferJet in step S1719 of FIG. 17B according to the fourth embodiment. The difference from FIG. 11 used to explain the first embodiment will mainly be described. A processing flow from step S1801 to step S1806 of FIG. 18A is the same as that from step S1101 to step S1106 of FIG. 11, and a description thereof will be omitted. In addition, processes in steps S1804 and S1805 when no response to the TransferJet connection request is received in step S1803 are the same as those in steps S1104 and S1105 of FIG. 11 described in the first embodiment and a description thereof will be omitted.

After TransferJet communication connection is established in step S1806, the process advances to step S1807, and the CPU 201 requests the partner terminal (mobile terminal 101) of the scan job ID. Although not shown, the cooperative application 400 operating on the mobile terminal 101 reads out the scan job ID held in the storage device 304 (or the RAM 302), and transmits it to the image forming apparatus 100 by TransferJet communication. Upon receiving the scan job ID, the process advances to step S1808, and the CPU 201 determines whether or not the previously generated scan job ID matches the ID received from the mobile terminal 101. If no scan job ID can be received, or the received ID does not match the generated ID, the process advances to step S1809. In step S1809, the CPU 201 displays, on the display unit 207, a message indicating that the scan job ID is unauthorized, and the process advances to step S1815. That is, if the job ID issued when the scan start instruction is received does not match the job ID received when TransferJet communication is established, or if no job ID can be received, no scanned image data is transmitted. This can prevent the scanned image data from being transmitted by TransferJet communication to a user other than the user who has issued the scan start instruction.

On the other hand, if the scan job ID received in step S1808 matches the issued ID, the process advances to step S1810 to execute the same processes as those in step S1107 and subsequent steps of FIG. 11 described in the first embodiment. Note that processes in steps S1810 to S1819 of FIGS. 18A and 18B are the same as those in steps S1107 to S1116 of FIG. 11 described in the first embodiment and a description thereof will be omitted. As the final processing, in step S1815, the CPU 201 deletes the scanned image data held in the storage device 204 (or the RAM 202), thereby ending the process.

As described above, according to the fourth embodiment, it is possible to prevent another user from intercepting and stealing the scanned image data during a period from when the user issues a scan start instruction until reception of the image data by TransferJet communication is completed.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-009777, filed Jan. 23, 2017, which is hereby incorporated by reference herein in its entirety.

What is claimed is:

1. An image forming apparatus having a short-range wireless communication function, comprising:
    a scanner that scans a document and generates image data of the scanned document;
    a storage that stores the image data generated by the scanner;
    a memory device that stores a set of instructions; and
    at least one processor that executes the instructions to function as:
    a control unit that, if an operation mode of scanning a document by the scanner and transmitting image data of the scanned document to an external apparatus by the short-range wireless communication function is instructed by a user input, controls to generate image data of a document by controlling the scanner, store the image data in the storage, and then, in response to the image data being stored in the storage, transmit the image data stored in the storage to the external apparatus by the short-range wireless communication function, and
    a console unit that has a display unit and accepts a user instruction,
    wherein, in response to storing the image data of the scanned document in the storage, the control unit performs display on the display unit to prompt a user to move the external apparatus to a communication area where short-range wireless communication is possible,
    wherein if the operation mode is instructed, the control unit establishes wireless communication connection to the external apparatus by the short-range wireless communication function, generates a job ID, and transmits the job ID to the external apparatus, and
    after generating the image data of the scanned document by controlling the scanner and storing the image data in the storage, the control unit requests the external apparatus of the job ID, obtains the job ID, and transmits, if the transmitted job ID matches the obtained job ID, the image data stored in the storage to the external apparatus by the short-range wireless communication function.

2. The apparatus according to claim 1, wherein if no response to a connection request by the short-range wireless communication function is received from the external apparatus, the control unit performs display on the display unit to prompt the user to move the external apparatus to the communication area where short-range wireless communication is possible.

3. The apparatus according to claim 2, wherein upon receiving the response to the connection request by the short-range wireless communication function from the external apparatus, the control unit transmits the image data stored in the storage to the external apparatus by the short-range wireless communication function while performing a display of a transmission progress.

4. The apparatus according to claim 1, wherein when the external apparatus falls within a communication area where short-range wireless communication is possible, if the operation mode is instructed, the control unit controls to generate image data of the scanned document by controlling the scanner, and store the image data in the storage after establishing wireless communication connection to the external apparatus by the short-range wireless communication function.

5. The apparatus according to claim 1, wherein upon completion of transmission of the image data stored in the storage to the external apparatus by the short-range wireless communication function, the control unit deletes the image data from the storage.

6. The apparatus according to claim 1, wherein the short-range wireless communication function is incorporated in the image forming apparatus or provided as a detachable device.

7. The apparatus according to claim 1, wherein the short-range wireless communication function is a wireless communication function using TransferJet.

8. A method of controlling an image forming apparatus having a short-range wireless communication function, the method comprising:

scanning a document and generating image data of the scanned document;

storing the generated image data in a storage; and controlling to, if an operation mode of scanning a document in the scanning and transmitting image data of the scanned document to an external apparatus by the short-range wireless communication function is instructed by a user input, generate image data of a document in the scanning, store the image data in the storage, and then, in response to the image data being stored in the storage, transmit the image data stored in the storage to the external apparatus by the short-range wireless communication function, in response to storing the image data of the scanned document in the storage, displaying to prompt a user to move the external apparatus to a communication area where short-range wireless communication is possible, if the operation mode is instructed, establishing wireless communication connection to the external apparatus by the short-range wireless communication function, generating a job ID, and transmitting the job ID to the external apparatus, and after generating the image data of the scanned document by the scanning and storing the image data in the storage, requesting the external apparatus of the job ID, obtaining the job ID, and transmitting, if the transmitted job ID matches the obtained job ID, the image data stored in the storage to the external apparatus by the short-range wireless communication function.

9. A non-transitory computer-readable storage medium storing a program for causing a processor to execute a method of controlling an image forming apparatus having a short-range wireless communication function, the method comprising:

scanning a document and generating image data of the scanned document;

storing the generated image data in a storage; and controlling to, if an operation mode of scanning a document in the scanning and transmitting image data of the scanned document to an external apparatus by the short-range wireless communication function is instructed by a user input, generate image data of a document in the scanning, store the image data in the storage, and then, in response to the image data being stored in the storage, transmit the image data stored in the storage to the external apparatus by the short-range wireless communication function, in response to storing the image data of the scanned document in the storage, displaying to prompt a user to move the external apparatus to a communication area where short-range wireless communication is possible, if the operation mode is instructed, establishing wireless communication connection to the external apparatus by the short-range wireless communication function, generating a job ID, and transmitting the job ID to the external apparatus, and after generating the image data of the scanned document by the scanning and storing the image data in the storage, requesting the external apparatus of the job ID, obtaining the job ID, and transmitting, if the transmitted job ID matches the obtained job ID, the image data stored in the storage to the external apparatus by the short-range wireless communication function.

* * * * *